(12) United States Patent
Marshall et al.

(10) Patent No.: US 12,530,723 B2
(45) Date of Patent: *Jan. 20, 2026

(54) OPTIMIZATION AND PRIORITIZATION OF ACCOUNT DIRECTED DISTRIBUTIONS IN AN ASSET MANAGEMENT SYSTEM

(71) Applicant: NISA Investment Advisors, LLC, St. Louis, MO (US)

(72) Inventors: William Patrick Marshall, Webster Groves, MO (US); Christopher Eric Goebel, St. Louis, MO (US); Nicholas Frank Cangiani, Jamison, PA (US)

(73) Assignee: NISA INVESTMENT ADVISORS, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,966

(22) Filed: Mar. 4, 2024

(65) Prior Publication Data

US 2024/0202830 A1   Jun. 20, 2024

Related U.S. Application Data

(63) Continuation of application No. 17/505,134, filed on Oct. 19, 2021, now Pat. No. 11,922,504.

(60) Provisional application No. 63/093,586, filed on Oct. 19, 2020.

(51) Int. Cl.
*G06Q 40/06* (2012.01)
(52) U.S. Cl.
CPC ........... *G06Q 40/06* (2013.01); *G06Q 40/062* (2025.08)

(58) Field of Classification Search
CPC ...................................................... G06Q 40/06
See application file for complete search history.

(56) References Cited

U.S. PATENT DOCUMENTS

| | | |
|---|---|---|
| 2004/0210500 A1 | 10/2004 | Sobel et al. |
| 2008/0052054 A1 | 2/2008 | Beverina et al. |
| 2008/0215474 A1* | 9/2008 | Graham ................ G06Q 40/04 715/764 |
| 2013/0080353 A1* | 3/2013 | Kovarsky .............. G06Q 40/06 705/36 R |
| 2014/0095376 A1 | 4/2014 | Tucker et al. |
| 2017/0041296 A1 | 2/2017 | Ford et al. |
| 2020/0186572 A1 | 6/2020 | Barday |

\* cited by examiner

*Primary Examiner* — Bennett M Sigmond
*Assistant Examiner* — Marla Hudson
(74) *Attorney, Agent, or Firm* — Thompson Coburn LLP

(57) ABSTRACT

An asset management system is disclosed where a plurality of financial databases may connect with and be in communication with an asset management tool. The asset management tool is able to create an individual spending plan (scheduled distributions) and matching fixed income investment portfolio for a user based on inputted parameters with automatic distributions from the portfolio consistent with the individual spending plan occurring with a high degree of certainty. The asset management tool may communicate with the plurality of financial databases to put the individual spending plan and matching portfolio into action and is able to calculate and communicate an optimized surplus investment as a means of self-insuring so that the predefined schedule of distributions is met with the effective certainty one would expect from an insured/guaranteed income product.

20 Claims, 30 Drawing Sheets

FIG. 9

Annual Cashflows Generated by DMF Investments

| Year | User Specified ISP Cashflows (A) 905 | | Amount to Invest in DMF to generate ISP Annual Cashflow (B) 910 | | Coupon payments from later years DMFs (C) 915 | Maturity of current year DMF (D) 920 | Total Flows Generated by DMFs (E = C+D) 925 | Generated by Excess Flows Generated (F = E+A) 930 |
|---|---|---|---|---|---|---|---|---|
| 1 | 10,000 | DMF 1 | $ 7,946 | 1 | 1,988 | 8,012 | 10,000 | - |
| 2 | 10,000 | DMF 2 | $ 8,337 | 2 | 1,721 | 8,279 | 10,000 | - |
| 3 | 10,000 | DMF 3 | $ 8,744 | 3 | 1,445 | 8,555 | 10,000 | - |
| 4 | 1,000 | DMF 4 | $ - | 4 | 1,440 | - | 1,440 | 440 |
| 5 | 1,000 | DMF 5 | $ - | 5 | 1,436 | - | 1,436 | 436 |
| 6 | 10,000 | DMF 6 | $ 9,667 | 6 | 1,102 | 8,898 | 10,000 | - |
| 7 | 10,000 | DMF 7 | $ 10,040 | 7 | 780 | 9,220 | 10,000 | - |
| 8 | 10,000 | DMF 8 | $ 10,583 | 8 | 438 | 9,562 | 10,000 | - |
| 9 | 10,000 | DMF 9 | $ 11,523 | 9 | 36 | 9,964 | 10,000 | - |
| 10 | 1,000 | DMF 10 | $ 1,140 | 10 | - | 1,000 | 1,000 | - |
| Totals | 73,000 | | $ 67,979 | | | | 73,876 | 876 |

Table 1000:

| Year | User Specified ISP Cashflows | Discount Factor | Present Value |
|---|---|---|---|
| | A | B | A x B |
| 1 | 10,000 | 0.99 | 9,918 |
| 2 | 10,000 | 0.98 | 9,753 |
| 3 | 10,000 | 0.96 | 9,595 |
| 4 | 1,000 | 0.94 | 943 |
| 5 | 1,000 | 0.93 | 926 |
| 6 | 10,000 | 0.91 | 9,075 |
| 7 | 10,000 | 0.89 | 8,890 |
| 8 | 10,000 | 0.87 | 8,704 |
| 9 | 10,000 | 0.85 | 8,522 |
| 10 | 1,000 | 0.83 | 834 |
| Totals | 73,000 | | 67,161 |

1005:
$$\text{Adjustment Factor} = \frac{\text{PV of ISP Cashflows}}{\text{Total DMF Investments}} = \frac{67,161}{67,979} = 0.98796$$

Table 1010:

| | Investment Amount from Previous Step | Adjusted Investment Amounts |
|---|---|---|
| DMF 1 | 7,946 | 7,850 |
| DMF 2 | 8,337 | 8,236 |
| DMF 3 | 8,744 | 8,638 |
| DMF 4 | - | - |
| DMF 5 | - | - |
| DMF 6 | 9,667 | 9,551 |
| DMF 7 | 10,040 | 9,919 |
| DMF 8 | 10,583 | 10,456 |
| DMF 9 | 11,523 | 11,384 |
| DMF 10 | 1,140 | 1,126 |
| | $ 67,979 | $ 67,161 |

FIG. 10

| Year | User Specified ISP Cashflows 1105 | Cashflows Generated by Adjusted DMF Investments | Residual Cashflows 1100 |
|---|---|---|---|
| 1 | 10,000 | 9,881 | (119) |
| 2 | 10,000 | 9,881 | (119) |
| 3 | 10,000 | 9,881 | (119) |
| 4 | 1,000 | 1,424 | 424 |
| 5 | 1,000 | 1,420 | 420 |
| 6 | 10,000 | 9,881 | (119) |
| 7 | 10,000 | 9,881 | (119) |
| 8 | 10,000 | 9,881 | (119) |
| 9 | 10,000 | 9,881 | (119) |
| 10 | 1,000 | 989 | (11) |
| Totals | 73,000 | 73,000 | 0 |

FIG. 11

|  | Step 1 | Step 2 | Total Portfolio |
|---|---|---|---|
| DMF 1 | 7,850 | 0 | 7,850 |
| DMF 2 | 8,236 | 0 | 8,236 |
| DMF 3 | 8,638 | 0 | 8,638 |
| DMF 4 | - | 0 | 0 |
| DMF 5 | - | 0 | 0 |
| DMF 6 | 9,551 | 0 | 9,551 |
| DMF 7 | 9,919 | 0 | 9,919 |
| DMF 8 | 10,456 | 0 | 10,456 |
| DMF 9 | 11,384 | 0 | 11,384 |
| DMF 10 | 1,126 | 0 | 1,126 |
| LD 1 |  | 18,947 | 18,947 |
| LD 2 |  | 18,894 | 18,894 |
|  |  |  | 105,001 |

FIG. 12

Non-Uniform: Plan Inception ⟵ 2200

Create Plan

Configure Non-Uniform Plan
To create your plan, please enter one or more cash flows.

[ Explore this Plan ]

Plan Parameters

Investment Amount
$122,431.89

| Date | Payout | |
|---|---|---|
| 12/31/2022 | $50,000.00 | [Remove] |
| 03/31/2022 | $75,000.00 | [Remove] |

Cash Flow Date          Payout Amount
[ 03/31/2027 ] 📅       [ 75000 ]

[ Add ]  [ Clear ]

[ Submit ]

⎱ 2205

Plan Payouts $60,000 —
$45,000 —
$30,000 —
$15,000 —
     $0 —
          12/31/2022                                    12/31/2025

☐ Cash Flow   ☒ Surplus

FIG. 22

OPTIMIZATION AND PRIORITIZATION OF ACCOUNT DIRECTED DISTRIBUTIONS IN AN ASSET MANAGEMENT SYSTEM

CROSS-REFERENCE AND PRIORITY CLAIM TO RELATED PATENT APPLICATIONS

This continuation patent application claims priority to non-provisional U.S. patent application Ser. No. 17/505,134, filed on Oct. 19, 2021, titled "Optimization and Prioritization of Account Directed Distributions in an Asset Management System", and now U.S. Pat. No. 11,922,504; which claims priority to U.S. provisional patent application 63/093,586, filed Oct. 19, 2020, and titled "Optimization and Prioritization of Account Directed Distributions in an Asset Management System", the entire disclosures of which are incorporated herein by reference.

INTRODUCTION

Investment portfolios typically have a return seeking objective consistent with underlying assets. However, when planned distributions from an investment portfolio are considered a mandate or liability, an investment portfolio should be managed to ensure these distributions occur with a high degree of confidence. This fundamentally changes the objective of the investment portfolio from purely a return seeking one to one that necessitates a risk-controlled approach to ensure the portfolio can support planned distributions. This can be accomplished using a risk-controlled investment approach generally referred to as Liability Driven Investing (LDI). LDI is utilized primarily on an institutional basis by Defined Benefit plan sponsors as a means for hedging corporate pension obligations—ensuring these obligations are met with confidence. Liability driven investing techniques can also be valuable to individual investors when considering known personal "liabilities" (i.e., future spending needs) but are rarely utilized given the complexity, cost and inefficiency of building and managing these custom portfolios of fixed income instruments on an individual basis. While certain investing/trading tools are available for investors attempting to build a basic liability driven investment portfolio comprised of "laddered bonds", these tools require heavy engagement and investment acumen and fail to provide the ability to customize or direct actual distributions. Additionally, ensuring scheduled distributions from an individual investment portfolio occur with high confidence requires a self-insuring mechanism or surplus investment unless the portfolio is perfectly matched and comprised of risk-free assets (i.e., US treasuries). This surplus investment acts as a buffer against known risks within the portfolio (e.g., credit, interest rate). Of course, insurance products such as income annuities can provide payout certainty but come with giving up control of one's money to the life insurance company underwriting the financial obligation. Income annuities also generally do not accommodate custom (non-uniform) payout schedules. And regardless of the type of annuity or annuity rider providing "guaranteed income", they are ultimately delivered via contract making them inefficient to transact, confusing (even to the agents selling them), and generally inflexible. Financial advisors increasingly recognize the value of predictable income as an important part of an individual financial plan but incorporating annuities is not only challenging, it immediately reduces assets under management (AUM), which is the basis for how most advisors are paid. And with trends in the financial advisory industry moving toward expanded fiduciary responsibilities, incorporating annuities into financial planning will become even more challenging from a compensation perspective given these traditional AUM-based pay structures for fiduciaries.

This traditional advisor revenue model based on AUM, also acts as a natural disincentive for investment management/advisory firms to develop income generating products for individuals that provide scheduled distributions through liquidating portfolios. However, latent demand for a non-insured investment solution designed to simplify income generation that is genuinely predictable continues to increase given demographic aging trends, persistent behavioral attitudes precluding retiree annuity purchases, industry adoption of income planning as necessary and the proliferation of financial technology firms facilitating innovative income product development.

Accordingly, it would be desirable to provide an asset management system that simplifies and expedites the process of constructing and managing an individual investment portfolio of fixed income instruments using enhanced liability driven investing (LDI) techniques incorporating a self-insurance feature with automatic payouts of all capital and interest according to a directed schedule. For purposes of efficiency we will refer to this de novo approach to generating predictable payouts from an investment portfolio for individuals as Income Driven Investing ("IDI") giving a nod to its Liability Driven Investing roots. Underlying investments within an IDI portfolio may be fixed income instruments meaning they possess characteristics consistent with fixed income (i.e., defined income/maturity). The inventors envision the associated asset management system simplifying the engagement for the investor who is seeking a personalized solution that provides predictable income generation from an investment portfolio. The asset management system is the underlining interconnection of databases and software necessary for the planning and modeling of liabilities of individual investors and delivering an investment portfolio (exclusive of insurance contracts) that extinguishes these liabilities predictably through scheduled/directed distributions of capital and interest while optimizing portfolio yield/return. The asset management system frames the solution as something more akin to guaranteed income annuities in that predictable income generation is the primary objective. Doing so within an investment environment (sans insurance contract) affords absolute liquidity and flexibility in creating a custom portfolio that delivers predictable payouts consistent with an individually directed distribution schedule or Individual Spending Plan ("ISP").

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles. In the drawings:

FIG. 9 illustrates annual cashflows calculations of the calculation engine during operation of the calculation engine in accordance with an embodiment of the disclosure.

FIG. 10 illustrates adjustment factorization of investments used by the calculation engine during operation of the calculation engine in accordance with an embodiment of the disclosure.

FIG. 11 illustrates a blend of component investments used by the calculation engine during operation of the calculation engine in accordance with an embodiment of the disclosure.

FIG. 12 illustrates combined component investments used by the calculation engine to create the target portfolio during operation of the calculation engine in accordance with an embodiment of the disclosure.

FIG. 22 illustrates another example graphical user interface of a non-uniform distribution model of the asset management tool in accordance with an embodiment of the disclosure.

DETAILED DESCRIPTION OF EXAMPLE EMBODIMENTS

Figure 1:
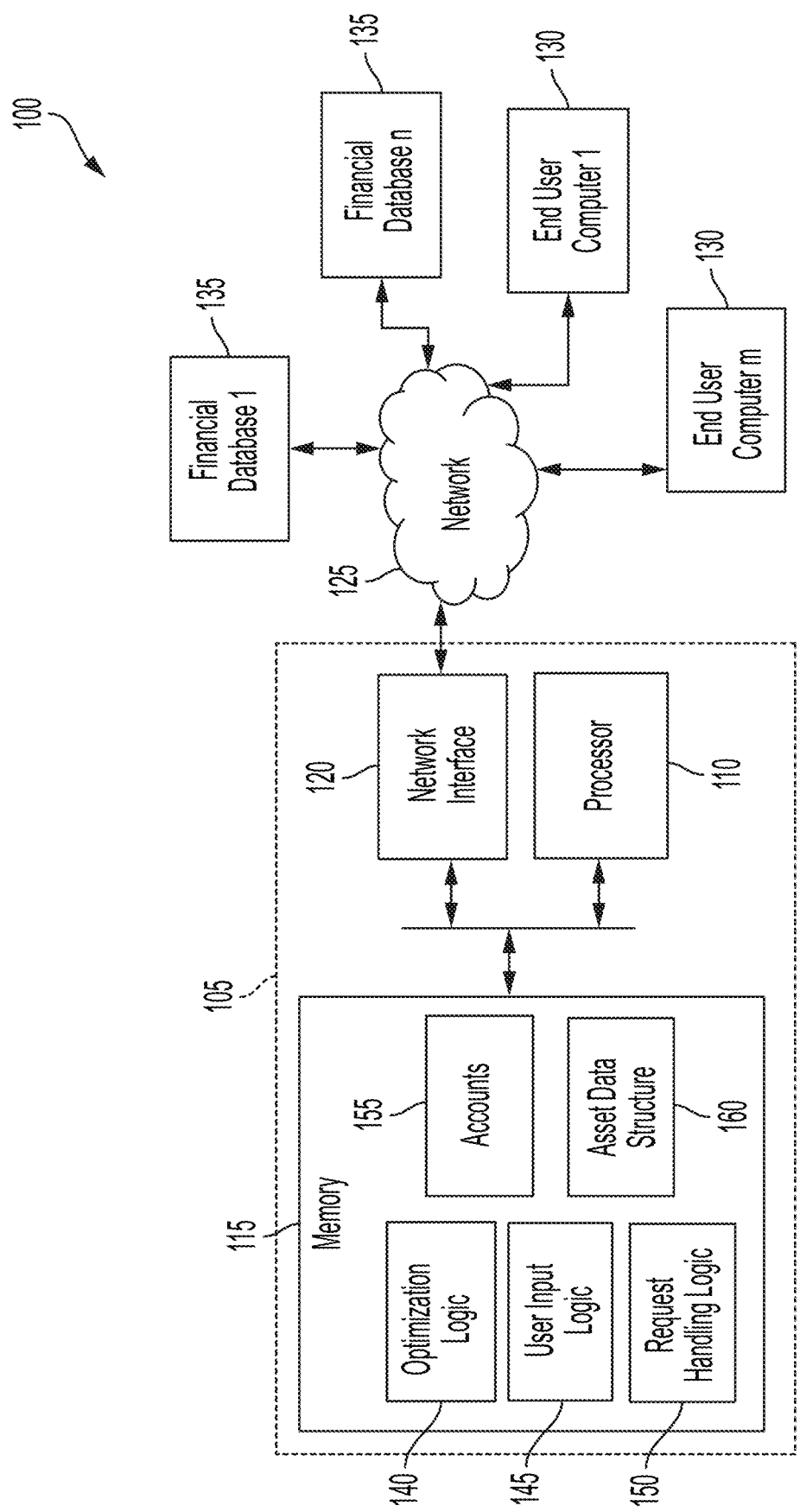
FIG. 1 illustrates an example of an asset management system in accordance with an embodiment of the disclosure.

Referring to the accompanying drawings in which like reference numbers indicate like elements, FIG. 1 illustrates an example asset management system 100. The asset management system 100 can be employed as a software-as-a-service (SaaS) platform, but may also be a software platform purchasable and licensed for use on an end user's computer. As a SaaS platform, the asset management system 100 may be implemented as part of computer system 105 operating as one or more servers. The computer system 105 may comprise a processor 110, a memory 115, and a network interface 120. The processor 110, memory 115, and network interface 120 can interconnected with each other in any of a variety of manners (e.g., via a bus, via a network, etc.)

The network interface 120 can provide an interface for the asset management system 100 to connect to a network 125. The network 125 can be any suitable communication network or combination of communication networks, such as the Internet, wired and wireless telecommunication networks, etc. Through the network 125, the asset management system 100 can interact with a plurality of end user computers 130 and a plurality of financial databases 135. The end user computers 130 and/or financial databases 135 can take the form of any suitable computer (such as a desktop computer, laptop computer, tablet computer, or smart phone) or larger computer system such as a server or server network. The network interface 120 may take any suitable form for carrying out network interface functions, examples of which include an Ethernet interface, a serial bus interface (e.g., Firewire, USB 2.0, etc.), a chipset, and antenna adapted to facilitate wireless communication, and/or any other interface that provides for wired and/or wireless communication. The network interface 120 may also include multiple network interfaces. Other configurations are possible as well.

The processor 110 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc. that are suitable for carrying out the operations described herein.

The memory 115 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The memory 115 may also be integrated in whole or in part with other components of the system. Further, the memory 115 may be local to the processor 110, but it should be understood that the memory 115 (or portions of memory) could be remote from the processor 110, in which case the processor 110 may access such remote memory 115 through network interface 120 (or some other network interface).

Memory 115 may store software programs or instructions that are executed by processor during operation of the system. For example, the memory 115 may include optimization logic 140, which can take the form of a plurality of instructions configured for execution by processor 110 for executing purchases and sells of identified assets in communication with the asset management system 100. The optimization logic 140 may take into account relevant attributes of the underlying fixed income assets such as, but not limited to, fixed income securities, fixed income funds, cash, certificates of deposit, brokered certificates of deposit, or any financial instrument that specifies a fixed income payout. The memory 115 may also store user input logic 145, which can take the form of a plurality of instructions configured for execution by processor 110 for receiving, processing, and delivering input data to the optimization logic 140 to aid in the calculation, timing, and determination of the flow of identified assets. The memory 115 may also store request-handling logic 150, which can take the form of a plurality of instructions configured for execution by the processor 110 for controlling user access to manage and administer liability profiles. The request handling logic 150 helps control how end users are granted access to their accounts that in some instances may be known as Individual Spending Accounts ("ISA"s).

The memory 115 may also be configured as a database or other storage design where a plurality of accounts 155 for end users is stored. Identifying information, owned assets, and login credentials can be stored in the account for that end user. Other memory addresses in the memory 115 can store an asset data structure 160. The data structure defines the information pulled from outside databases regarding potential assets that may be selected and used as part of the optimization logic 140 for the asset management system 100. It should be understood that the asset data structure 160 could be a single data structure or a plurality of data structures. It should also be understood that asset data structure 160 could be fluid and change over time as the content of the memory 115 changes.

Figure 2:
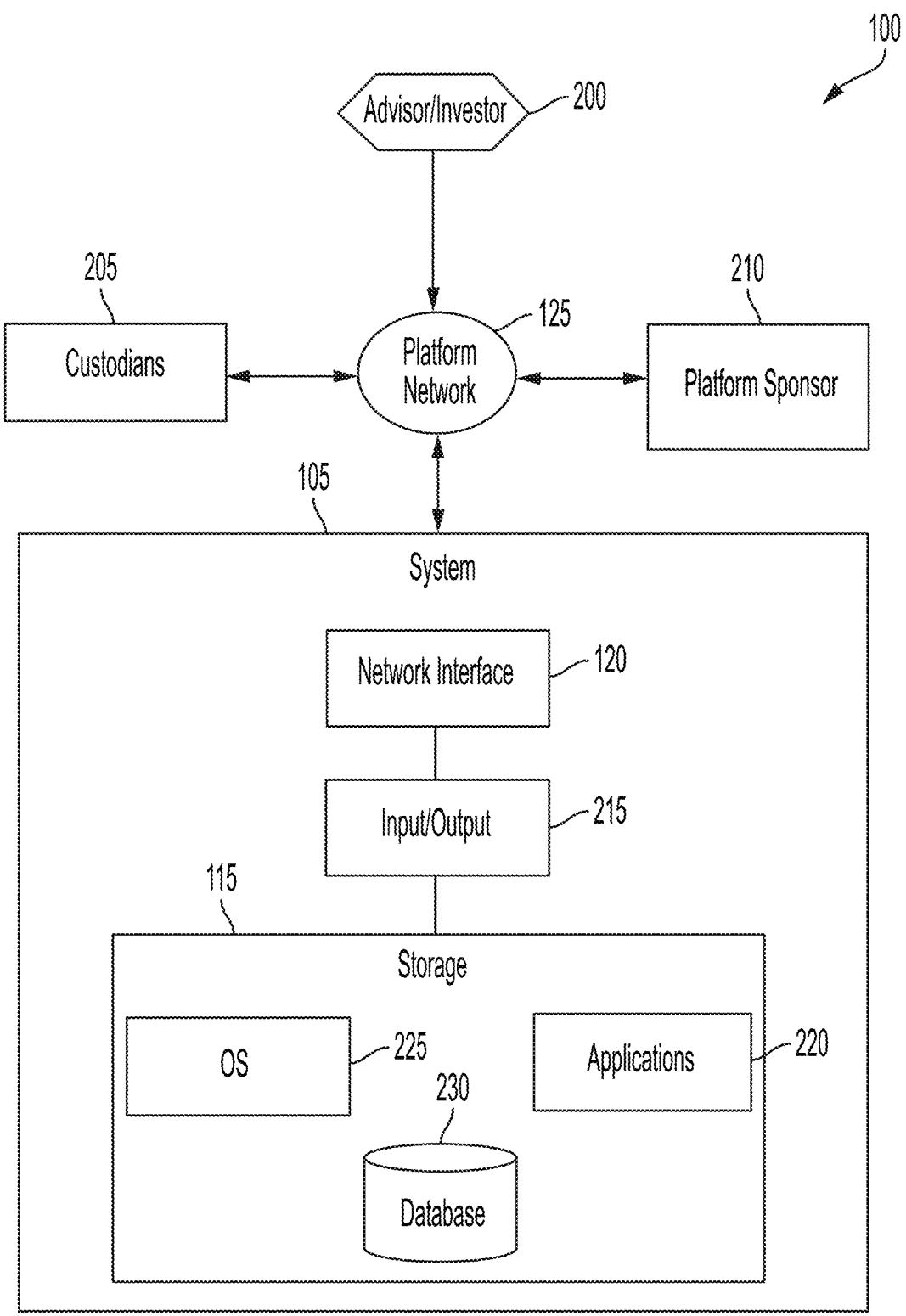
FIG. 2 illustrates a high-level flow chart of the asset management system in accordance with an embodiment of the disclosure.

Turning now to FIG. 2, and a high-level flow chart of the asset management system 100 is viewed with its association to outside computer systems. The asset management system 100 uses the network 125 to receive and send communication between the computer system 105 and end user computers 130 or financial databases 135. The end user computers 130 may be a separate computer system from which an investor 200 who is an owner of an account on the asset management system 100 may log into to access the asset management system 100 and adjust the distribution of selected investments within a selected liability portfolio. These portfolios and their associated distributions are presented to the end user as spending plans. The end user computers 130 may also include advisor computers where an advisor 200 who has authorized authority to manage and maintain an account of an investor 200 can log into and access the asset management system 100 on behalf of an authorized investor 200. Both the investor 200 computer system and the advisor 200 computer system may have a display connected to the computer system. The display may be able to visualize instructions communicated by the asset management system 100 to the end user computers 130 to produce a graphical representation of account activity initiated by the end users. Additionally, both the investor 200 computer system and the advisor 200 computer system may have a user input interface to input commands and information to be evaluated, optimized, executed, and displayed by the asset management system 100. The user input interface may consist of many different types of input technology including but not limited to keyboards, mouse use for navigation, or touchscreen technology.

A plurality of financial databases 135 may also connect to the asset management system 100 through the network 125. The financial databases 135 may include custodians 205 who may have control and management authorization over particular assets that may be included as possible investment options within the asset management system 100. In some instances, the custodians 205 may also have control of an individual investor account or a plurality of investor spending accounts stored on the asset management system 100. Additionally, the financial databases 135 may include platforms 210 that are accessibility by the asset management system 100. These platforms 210 may be investment opportunities in particular sectors of business and different types of investable funds managed and maintained by a third party operation. Data concerning these investment opportunities may be transmitted to the asset management system 100 through the network 125. In other instances, data concerning these investment opportunities may be transmitted to the asset management system 100 for utilization by the optimization logic 140 of the asset management system 100.

The computer system 105 of the asset management system 100 itself is also connected to the network 125. To facilitate connections and communication with the end users 130 and financial databases 135, the asset management system 100 has an input/output interface 215 from which logic commands are transmitted to either the network interface 120 and out to the entire network 125 or to the memory 115 of the computer system 115 of the asset management system 110. Within the memory 115 of the asset management system 100, storage of applications 220 may be present. One such application 220 may be an asset management tool that may take the form of computer software to run the overall operation of the asset management system 100. The asset management tool may interpret data stored in each the optimization logic, user input logic, and handling logic to run commands and queries of the asset management system 100. It is also possible that additional applications 220 may be stored within the application partition of the memory 115 in the asset management system 100. These additional applications 220 may aid in the optimization and execution of the asset management tool or provide additional benefits to the asset management system 100. An operating system 225 may also be stored within the memory 115 of the asset management system 100. The operating system 225 may be a known or easily accessible operating system, such as but not limited Windows or Linux, which can allow for easy and known operation of the applications 220 stored in the memory 115.

There may also be a database 230 as a partition of the memory 115 in the asset management system 100. The database 230 may store and create logic tables from information inputted into the asset management system 100 through the network 125. The database 230 may store information related to accounts of users that can access the asset management system 100 as well as tables and data structures created by the optimization logic 140, user input logic 145, and handling logic 150. The database 230 may also store informational and analytic information related to debt instruments to be used by the asset management system 100.

As introduced above, the asset management system 100 may include an asset management tool to establish a liability profile/Individual Spending Plan ("ISP") for each account. The asset management tool can also be used to construct and manage the liability portfolio to include asset allocation determinations and trade instructions including redemptions associated with directed payouts.

Figure 3:
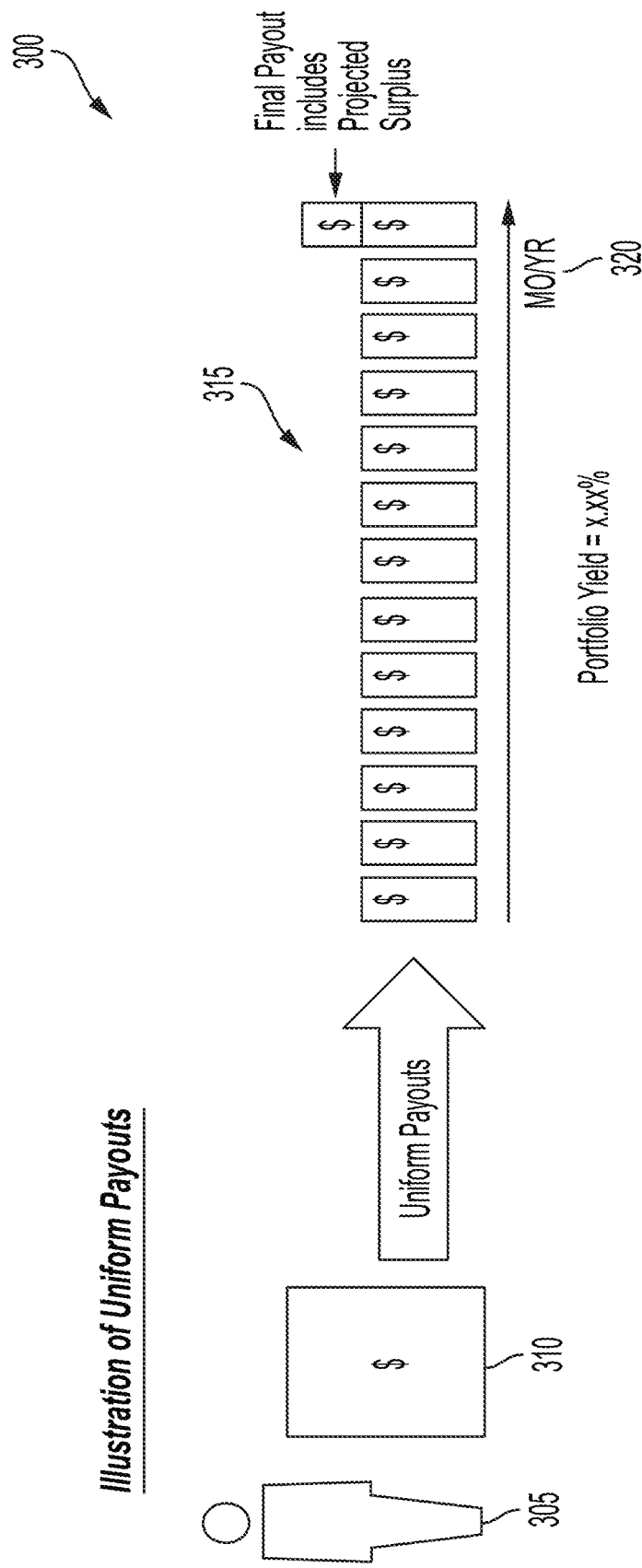
FIG. 3 illustrates an example of a created uniform "liability profile" by the asset management tool in accordance with an embodiment of the disclosure. A liability profile is simply the calculated/directed payouts from an Individual Spending Account (ISA). A liability profile is also referred to as Individual Spending Plan (ISP).

The asset management tool can be used by account holders such as investors 200 and financial advisors 200 to assess an asset investment with payouts/distributions intended to match a given liability profile. The asset management tool has the ability to create multiple different liability profiles. A liability profile of the asset management tool can be described as either uniform or non-uniform. Viewing FIG. 3, an example of a created uniform liability profile 300 can be viewed. In the case of a uniform profile 300, an account user 305, such as an investor, indicates multiple data points, or parameters, to be entered into the asset management tool for calculation and optimization of the profile 300. These data points entered by the account user 305 can include information related to either the investment amount 310, the payout amount 315, or the final payout date 320. Only two of these three initial inputs are required to be inputted by the account user 305 to create the desired uniform liability profile 300. Once two of the three inputs are entered, the remaining input can be calculated by the asset management system 100 and can be automatically populated for the account user 305.

Figure 4:
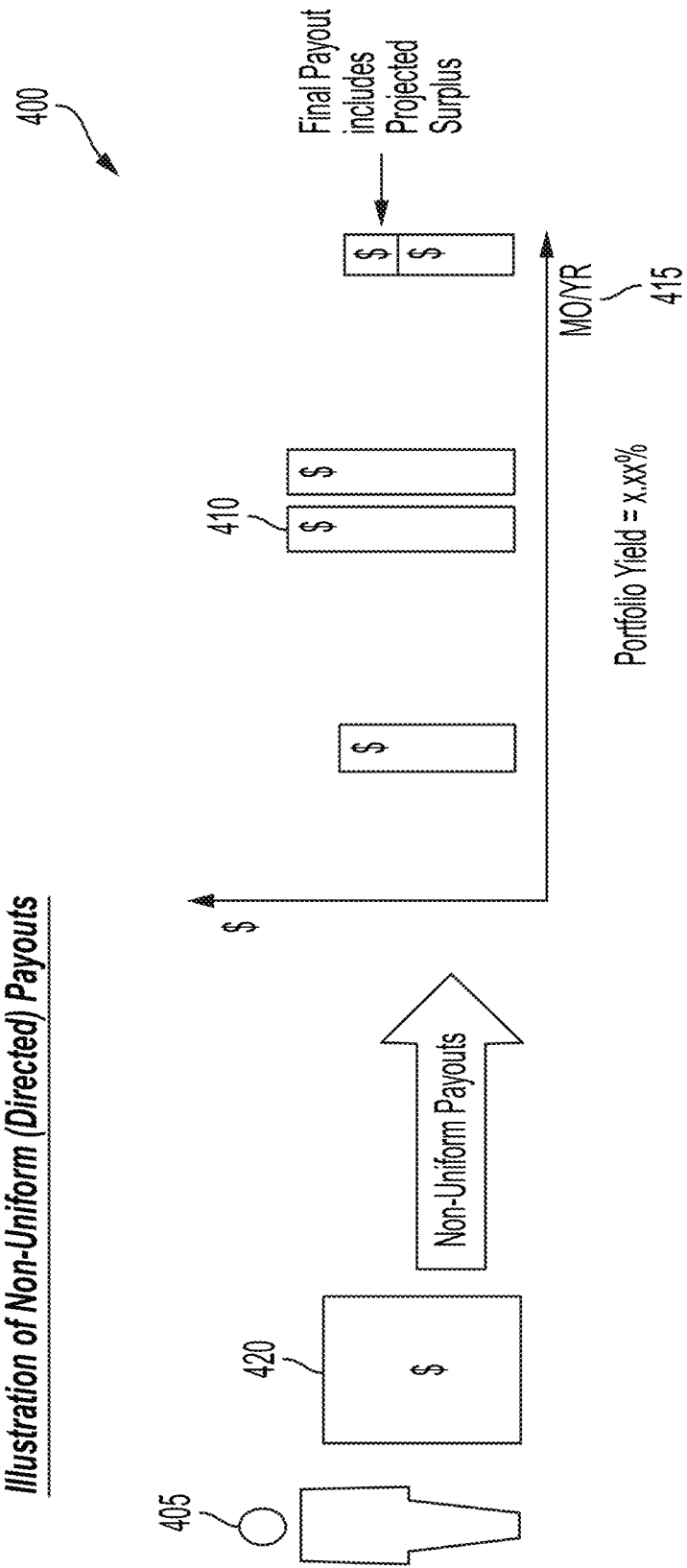
FIG. 4 illustrates an example of a non-uniform liability profile/Individual Spending Plan by the asset management tool in accordance with an embodiment of the disclosure.

As seen in FIG. 4, an example of a non-uniform liability profile 400 is viewed as created by the asset management tool. For the creation of a non-uniform liability profile 400, an account user 405 indicates one or more of payout amounts 410 and payout dates 415. After such information is inputted into the asset management system 100, the asset management tool can then calculate the initial investment amount 420, which can be automatically calculated for the account user 405. Alternatively, the account user 405 can indicate the investment amount 420 and a single payout date 415. In that instance, the calculated payout amount 410 can be automatically populated for the account user 405. This allows an account user 405 to approach the problem in a way best suited to the situation depending upon whether the account user 405 has a set investment or wants to know the required investment amount given the desired payout(s).

Customization within the asset management tool includes payments in the form of nominal or real payouts. Real payouts may be adjusted according to an inflation metric disclosed during client engagement with the account user. Alternative inflation metrics may be considered and offered in certain variations. With regards to a uniform liability profile 300, an account user of the asset management tool can select the frequency of payouts with monthly being the default setting. An account user may also defer the start date of payouts under a uniform liability profile 300. Minimum investment amounts may vary across the financial databases such as certain advisory or defined contribution record keeping platforms where the solution can be made available. Other constraints associated with customization features of the asset management tool may also be imposed including the maximum period over which the directed payouts will occur.

The asset management system 100 and asset management tool further solves problems of prior graphical user interfaces and their underlying functionality in the context of computerized income modeling relating to individual usability, utility, and execution. The asset management system 100 and asset management tool is directed to improvements in graphical user interfaces that have no pre-electronic analog comparison and involve the transformation of information inputted into a calculable format for processing to output a strategical asset allocation plan that is more than simple selection and display of general data information. This technological solution requires a specific graphical user interface paired with a prescribed functionality directly related to the graphical user interface's structure that addresses and resolves a specifically identified set of problems in prior analog systems.

Current analog models for income generation through an investment portfolio utilize investment products and associated modeling tools primarily employing asset-only portfolio optimization techniques where effective certainty of planned distributions cannot be assumed with high confidence and require heavy engagement and acumen to implement. Additionally, these planned distributions are not typically scheduled in concert with a modeling exercise leaving the user to independently effect these distributions. Where liability driven income tools exist in the marketplace (for investment portfolios), they are not arranged in a way that allows a user (individual investor, their advisor, or custodian) to present the desired outcome (i.e., desired income). Instead, users are expected to create a "laddered" portfolio with illustration of income occurring subsequent to the selection of securities or funds to construct this portfolio. Furthermore, constructing this "laddered" portfolio using individual corporate debt securities (bonds) presents the daunting task of selecting from a very wide range of individual securities of various terms and credit quality. Generating even a simple uniform distribution of income via this method is very challenging even for experienced advisors and ultimately the risk of concentrated credit exposure to any single issuer cannot be mitigated effectively. One example of an underlying investment type of an income driven portfolio is a defined maturity fund ("DMF"), which facilitates the diversification of fixed income risks associated with individual fixed income securities while maintaining their maturing nature. Traditionally, fixed income (bond) funds are perpetual in nature in terms of their remaining age—replacing maturing bonds with outstanding bonds to maintain the same duration or average remaining age of the fund based upon maturities of all the individual bonds. Defined Maturity Funds on the other hand combine the diversification benefit of pooling individual securities with the characteristics of an individual security in that they liquidate at maturity. Thus, while defined maturity funds (DMFs) can diversify the concentrated credit risk associated with individual debt securities, the income tools associated with these defined maturity funds are rudimentary with the added complication of not being able to actually inform the user as to what future declared dividends could be possible from these funds. In other words, while a defined maturity fund is intended to mimic the individual bond characteristic of a liquidating fixed income asset with a defined maturity, it cannot provide certainty around the level of income an individual can expect prior to maturity as dividends declared by these funds are not precisely aligned with the underlying asset distributions (e.g., coupon payments/maturing bond proceeds).

Thus, no existing digital or technology platform allows an account user to establish a custom liability profile that is intended to be matched using an investment portfolio employing liability driven techniques with execution occurring automatically. The asset management system 100 and asset management tool provides this capability through a uniquely structured graphical user interface with prescribed functionality directly related to this new interface. This functionality includes portfolio construction and optimization using proprietary liability driven investment techniques, intuitive and de novo visual representation of all requisite information, and automatic scheduling of the corresponding distributions designed to match or extinguish the user defined liability profile.

Figure 5:
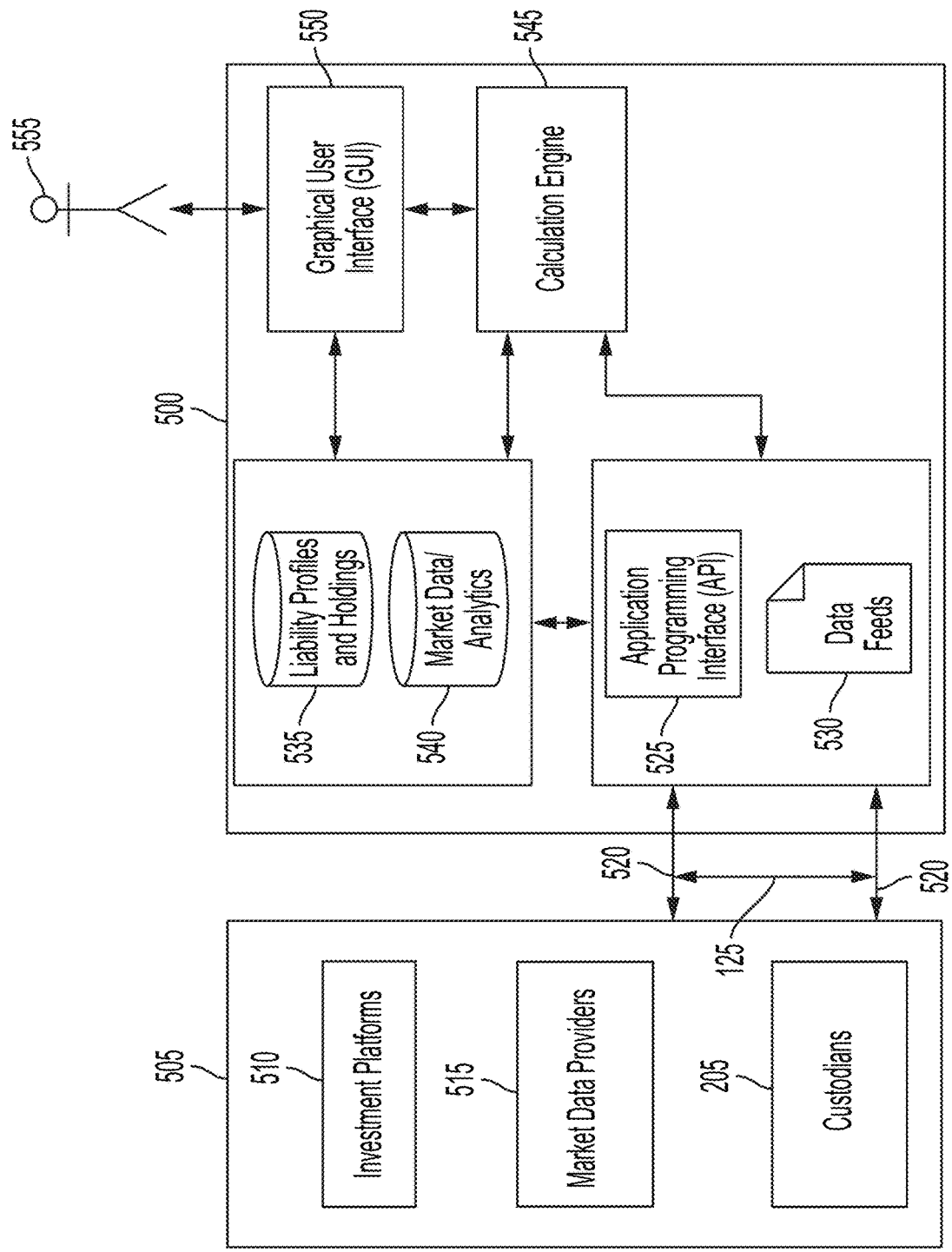
FIG. 5 illustrates an asset management tool of the asset management system in accordance with an embodiment of the disclosure.

In FIG. 5, the asset management tool 500 of the asset management system 100 is view in more detail. The plurality of financial databases 505 is viewed on the left side. As discussed above, custodians 205 may be part of these financial databases 505 as well as platforms such as specific investment platforms 510 dedicated to a particular asset to be available for calculation by the asset management tool 500. Also included as part of the financial databases 505 may be market data providers 515. These market data providers 515 may provide specific analytics and static information to the asset management tool 500 regards trends, current status, and value of specific markets in which the assets trade and their current calculated values. Through the network 125, these financial databases 505 communicate with the asset management tool 500. The communication signals 520 between the financial databases 505 and the asset management tool 500 may be encrypted at the point of origin and decrypted at the point of reception to further secure the transfer of sensitive information between these system components.

Within the asset management tool 500, an application-programming interface (API) 525 may be present. The application-programming interface 525 may run call instructions from the asset management tool 500 to connect to select financial databases 505 authorized for communication with the asset management tool 500. Through these application programming interface connections, data feeds 530 may flow into the asset management tool 500 from the connected financial databases 505. The data feeds 530 ingest and egress data into the asset management tool 500 for later consumption and execution by each the calculation engine 545 of the asset management tool 500 and the determination and development of market data analytics 540 of a specific asset of the data feed 530. The data feeds 530 may be accessed by the asset management tool 500 in either pre-defined time intervals, or may update in real time based on the behavior of a specific asset or the reporting procedures of the financial database 505 communicating with the asset management tool 500.

A liability profile 535 is present within the asset management tool 500. The asset management tool 500 can create a custom liability profile 535 to the specification of the end user. As discussed above, certain inputs may be inputted into the asset management system 100 by the end user to be used by the asset management tool 500 to create the liability profile 535. Once created, the asset management tool 500 selects specific asset holdings that will make up the Individual Spending Account investment portfolio. The asset management tool 500 can then manage the asset holdings to the specification of the liability profile 535.

The asset management tool 500 is further intended to utilize current and projected future market data and analytics 540 to produce estimates of income, either through uniform or non-uniform distributions. Once income estimates have been established and an investment has been made, the asset management tool 500 can allocate assets to and rebalance among several investment options to provide for these defined payouts based on the wishes of the end user of the account. Creation of current and projected future market data and analytics may be accomplished by the passing of information contained in the data feed 530 to the market data and analytics 540 for computation by the calculation engine 545 of the asset management tool 500.

The calculation engine 545 of the asset management tool 500 both establishes income estimates given sets of parameters inputted into the asset management system 100, and establishes a database within the asset management tool 500 that stores inputs, outputs, market data, and analytics. If/when rebalancing of a liability profile 535 is needed, a rebalance model will be present and in communication with the calculation engine 545. The rebalance model may execute an optimization algorithm or optimization program which confirms that assets currently held within the Individual Spending Account of the end user are on course to meet the desired payment distributions selected by the end user of the account. If these assets are not optimal in being able to make desired payment distributions, the rebalancing model redistributes the assets of the profile through a series of buy and sell transactions to rebalance the profile to meet the desired payment distributions directed by the end user of the account.

The calculation engine 545 will leverage the inputs and a rebalance model to allocate individual participant assets among various fixed income investments providing a known payout(s) to best match the payouts established as part of an Individual Spending Plan. The calculation engine 545 and rebalance model will periodically rebalance due to passage of time, analytics, participant holdings and actions, and market data, according to the established rebalance model. Rebalance instructions can be communicated to the financial databases 505, such as investment platforms 510, through the network 125 for implementation. Machine learning may be used to test and train the rebalance model used by the calculation engine 545.

If applicable, the calculation engine 545 computes a default risk probability for each available investment component that represents the likelihood of default of one or more underlying holdings of the investment component. These are converted to scaling factors that are applied to the projected cash distributions of each investment component to account for the anticipated aggregated default of the underlying debt holdings of each investment component. Incorporating these scaling factors into the calculation process allows the calculation engine 545 to cash flow match short and long-term payments with a greater degree of certainty.

The asset management tool 500 will leverage machine-learning techniques to improve the accuracy of scaling factors over time. The asset management tool 500 will utilize default risk estimates provided by third-party data providers and apply additional adjustments based on a trained predictive model to improve accuracy. Ex-ante predicted default rates for specific issuers, classifications, categorizations, and other attributes of debt securities will be compared against ex-post actual default rates to train the predictive model. Improvement in the model over time will result in a reduction in the range of outcomes and thus help to minimize the surplus investment necessary to ensure all Individual Spending Plan (ISP) distributions will occur with high confidence.

The asset management tool 500 will also consist of a graphical user interface (GUI) 550 that allows a user 555 to adjust one or more parameters in their liability profile 353. These parameters may be either the investment amount, payout amount, or final payout date for the associated liability profile/ISP 535. Once the parameters are inputted by the end user 555, the calculation engine 545 establishes income estimates given the sets of parameters input, and the database stores inputs, outputs, market data, and analytics. Interaction with the asset management tool 500 and asset management system 100 will be accomplished through a combination of the graphical user interface 550 and the exposed network application-programming interface to provide data into the system. The plurality of end user computers 130 from which the Individual Spending Account owner accesses the asset management tool 500 of the asset management system 100 may have a display computer to which the asset management tool 500 transmits electronic signals to view the graphical user interface 550.

Figure 6:
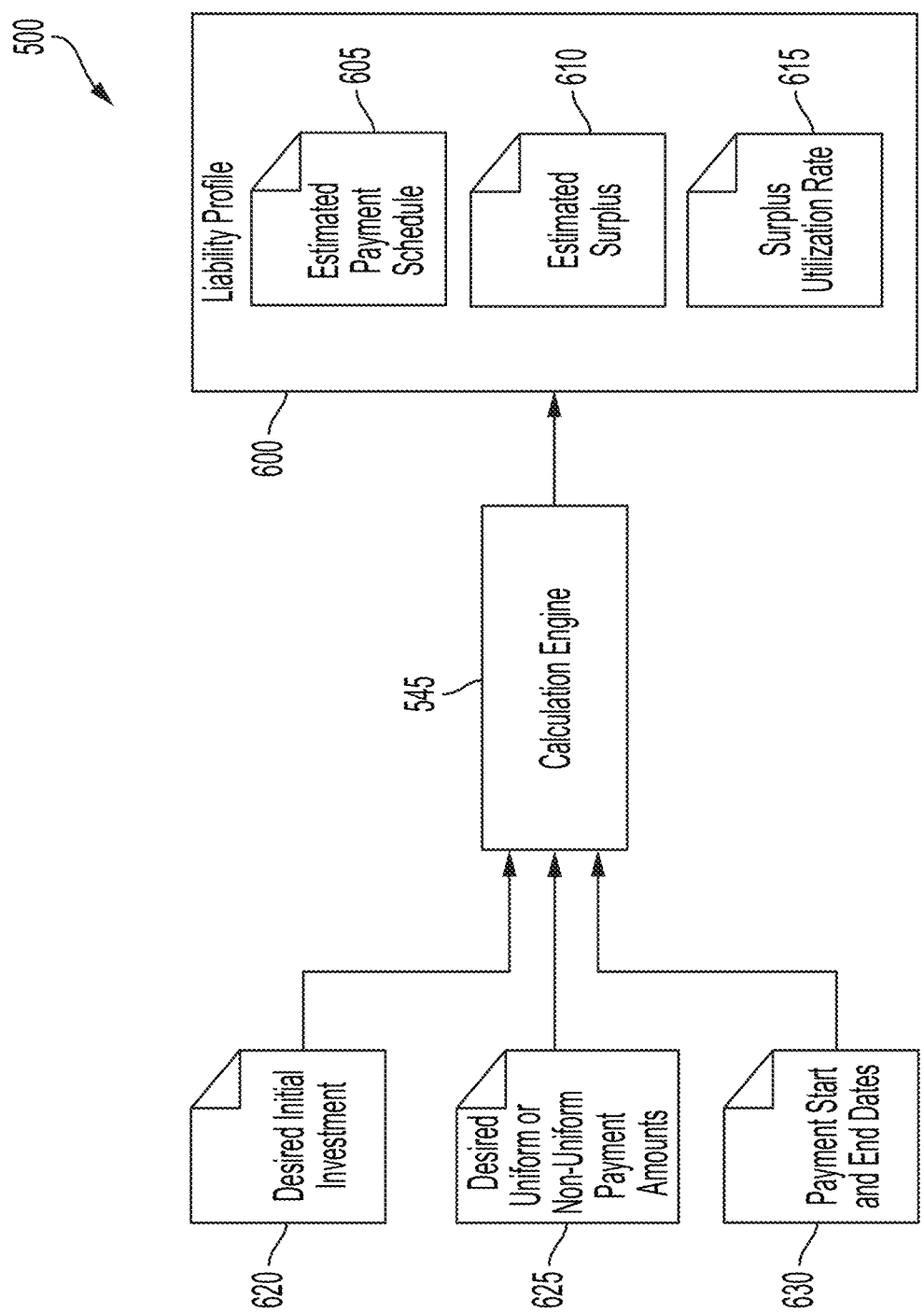
FIG. 6 illustrates a calculation engine of the asset management tool in accordance with an embodiment of the disclosure.

Turning to FIG. 6, operation of the calculation engine 545 of the asset management tool 500 is seen in greater detail. When preparing estimates and ingesting user data, the asset management tool 500 will transform parameters inputted by the user into a liability profile/Individual Spending Plan 600 or 535, which consists of a series of scheduled estimated payments 605 of invested principal and interest. Surplus investment 610 will be calculated minimally on a daily basis that represents a cushion or reserve to ensure that expected/implied portfolio volatility will not preclude the portfolio 600 from generating the scheduled distributions. Furthermore, a surplus utilization rate 615 of the liability profile 600 may be present. This surplus utilization rate 615 represents the expected utilization of the surplus amount calculated at the inception of the plan over time throughout the life of the Individual Spending Plan. The calculation engine 545 has three main functions within the asset management tool 500. The first main function is to calculate a liability profile 600 of the end user of the account. To accomplish this task, several inputs are required to enter the calculation engine to perform the necessary computations as discussed above.

Once a set number of the required inputs are entered into the asset management tool 500, the calculation engine 545 begins its computational work. The calculation engine 545 processes the necessary inputs to invoke a simulated path from initial investment to last payment based on the input parameters. The path is created by the calculation engine 545 by using market data and analytic assumptions to calculate an individual liability profile/spending plan. After the processing of the calculation engine 545 is complete, the calculation engine 545 provides outputs to the asset management tool. The liability profile 600, which may be visible on the graphical user interface of the end user, shows the set the estimate payment amounts and dates computed by the calculation engine 545. The liability profile 600 consists of a payment schedule 605, a surplus investment 610, and a surplus utilization rate 615. The surplus investment 610 constitutes the remaining balance estimated to be in the account and incorporates both unused assets and capital appreciation at the end of the payment schedule.

The calculation engine 545 quantitatively determines the allocation to available underlying investment components by splitting the payment horizon into short-term (e.g., <10 years) and long-term (e.g., >10 years). Short-term payments can be defined maturity funds or other fixed income investments with similar maturity profiles. Long-term cash flows are generated with an allocation to fixed income investments/funds with durations designed to limit yield curve exposure differences versus the desired payouts of an Individual Spending Plan (ISP). Cash flow projections of defined maturity funds and other fixed income investments are adjusted by the previously calculated scaling factors. Allocations are recalculated and rebalanced based upon defined threshold(s) that maintain the effective certainty of ISP payouts in conjunction with established rebalance timeframes (e.g., monthly).

The calculation engine 545 receives a plurality of inputs to create and compute the desired payouts of an individual spending plan (ISP). The calculation engine 545 can receive external data sets from third party servers or databases. These external data sets may be specific data compiled and distributable by the third party servers and can access the calculation engine 545 through the API interface of the asset management tool 500. The external data sets may be associated with fund holding information. Thus, these external data sets can be directed to the type of investment vehicle that can be used to create the individual spending plan. In some instances, these external data sets may be information related to defined maturity funds. In other instances, these external data sets may be information related to long-duration funds. Both defined maturity funds and long-duration funds are excellent investment vehicles used and employed by the assets management tool 500 for creation of the requested individual spending plan. The received external data may also contain information on the default probabilities associated with the external data set. In some instances, these default probabilities can be obtained from a third-party server or database that may or may not be associated with the external data set. The default probabilities help the calculation engine 545 perform its function in determining which of the external data sets would be most appropriate for the requested individual spending plan.

The calculation engine 545 can receives a plurality of inputs from the user as discussed both above and below. These user inputs include payment details specified by the user when executing the requested set up of the individual spending plan. For example, the user may input the desired initial investment 620, the desired uniform or non-uniform payment amounts 625, and/or payment start and end dates 630. When the calculation engine 545 is in operation, the user usually does not input this information for the individual spending plan as such information is already stored within the asset management system 100. However, there may be some instances where additional user input at this stage is possible to correct or confirm the requests for the individual spending plan. Overall, the calculation engine's operation is a backend process with few user-facing interactions.

Once the individual spending plan information and external data sets are loaded into the calculation engine 545, the calculation engine 545 can perform the required processing to create the required investments needed to meet the desired payouts of the individual spending plan. Afterwards, the calculation engine 545 can execute the investment of capital into the selected investments so that the individual spending plan is implemented. The process flow of the calculation algorithm of the calculation engine 545 can be viewed in greater detail within FIG. 7-11.

Figure 7:
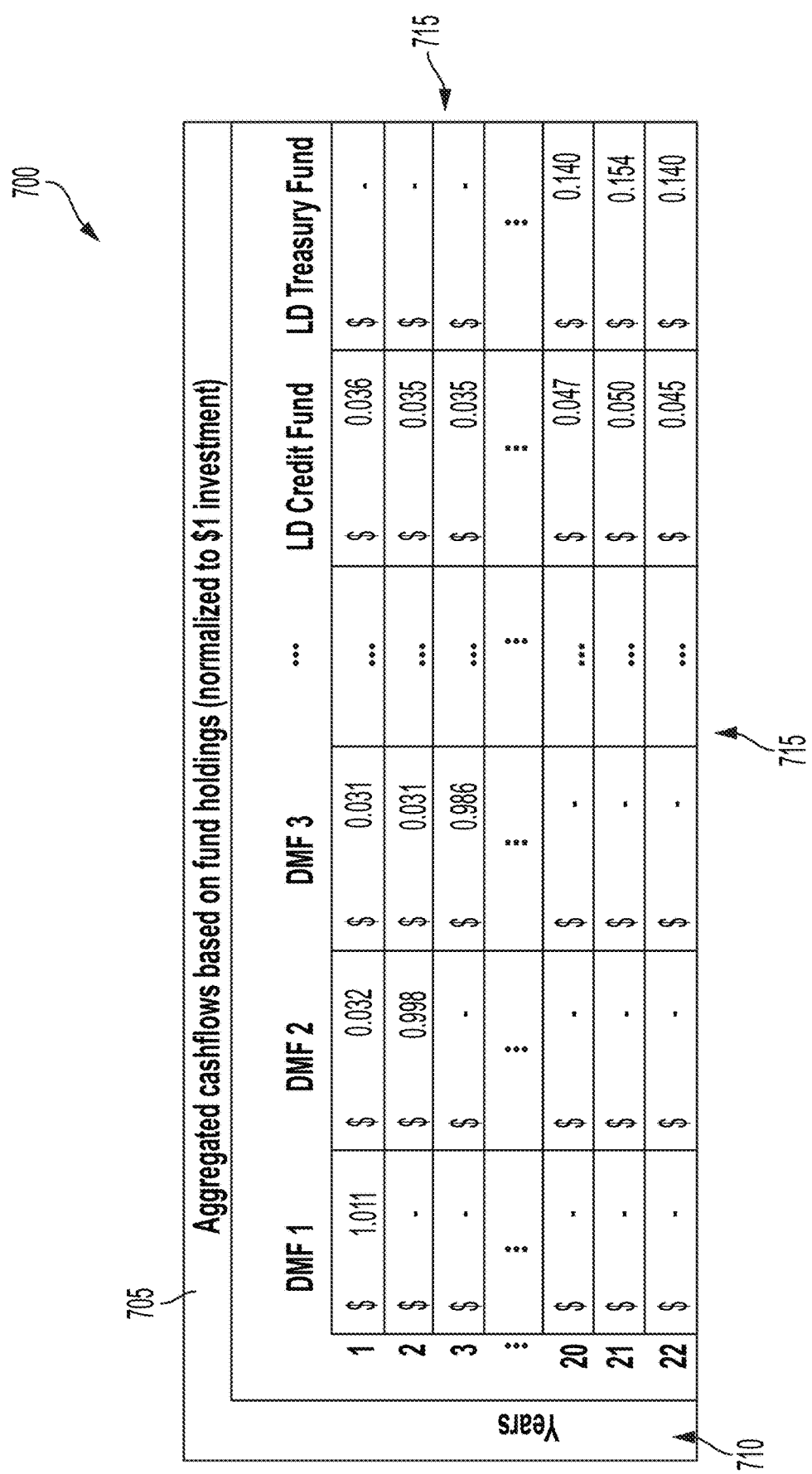
FIG. 7 illustrates aggregated cashflow calculations of the calculation engine during operation of the calculation engine in accordance with an embodiment of the disclosure.

As a first step, the calculation algorithm 700 calculates the cash flows of the component funds (i.e. investments) that are loaded into the calculation engine from the external data sets. The calculation algorithm 700, as seen in FIG. 7, then projects aggregated flows 705 for the securities held in each fund based on the holding details obtained from the fund providers. These holding details can be part of the external data set provided to the calculation engine 545 from the outside servers/databases. To project these aggregated flows 705, the calculation engine 545 can create an aggregated cash flow matrix 715 associating appropriate data from the external data set in a tabular format for easy evaluation and look up potential. In the aggregated cash flow matrix 715, the aggregated cash flow 705 of the fund holdings normalized to a currency data point is viewed against a period of investment 710. Usually, the period of investment 710 is broken down into yearly segments, but other time based breakdowns are possible.

Figure 8:
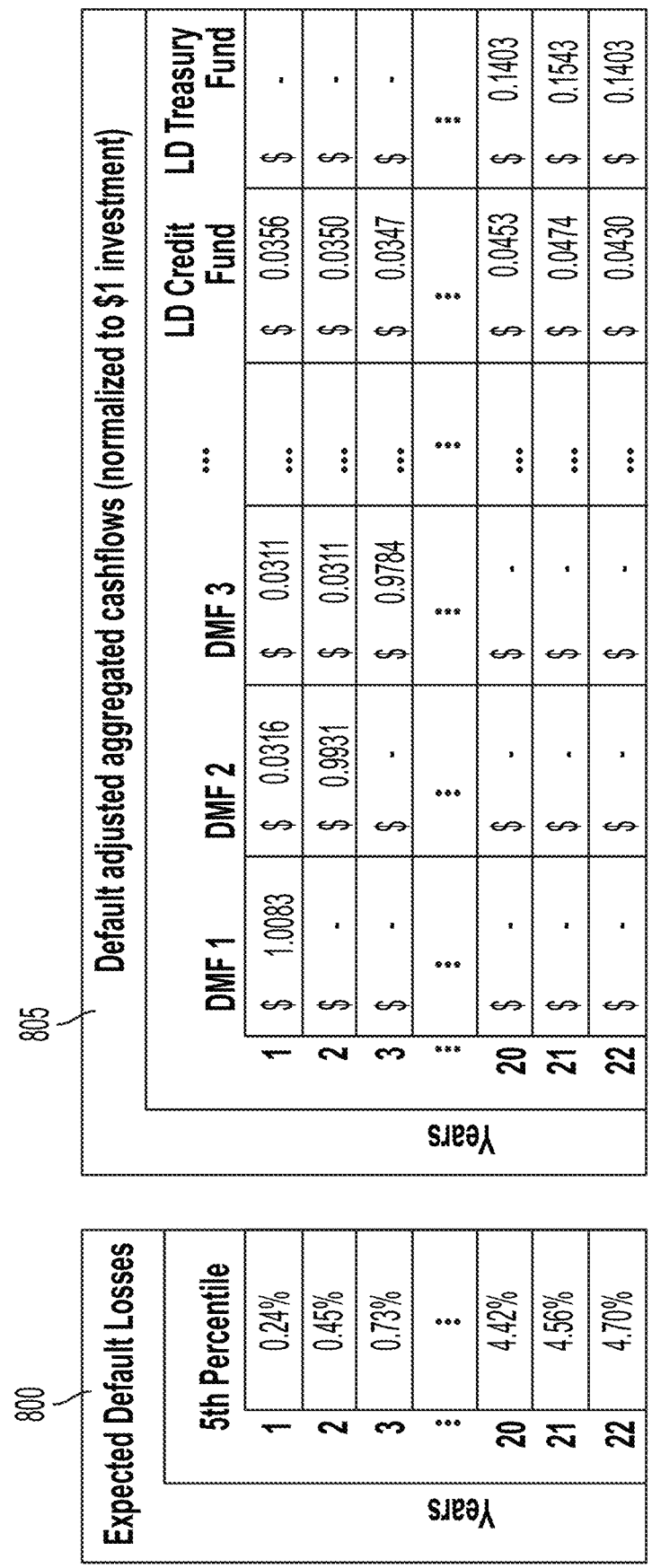
FIG. 8 illustrates default adjusted aggregated cashflow calculations of the calculation engine during operation of the calculation engine in accordance with an embodiment of the disclosure.

From there, and as seen in FIG. 8, the calculation algorithm 700 adjusts the flow of funds for expected default losses at the fifth percentile likelihood based on default data from the aggregated cash flow matrix 715. If US Government debt securities (treasuries) are utilized as the selected funds, the assumed losses from default are zero. The calculation algorithm 700 creates an expected default loss matrix 800 based on this percentage of acceptable loss against a period of investment 710. The calculated default loss matrix 800 is used against the aggregated cash flow matrix 715 to create an adjusted cash flow matrix 805 for the calculation engine 545. The adjusted cash flow matrix 805 represents an adjusted aggregated cash flow based on the default loss matrix calculations. The adjusted cash flow matrix 805 is the aggregated cash flow of the of the fund holdings normalized to a currency data point adjusted with the calculated default loss against a specific period of time. Finally, if dividend policies are needed to be included with the component funds, and required as part of the external data set to create these matrices, the dividend policies are applied to adjusted aggregated cash flows. In these instances, the adjusted aggregated cash flows will become probability-adjusted aggregated cash flows pursuant to the dividend policies required by the respective component fund.

Turning now to FIG. 9, step two of the operation allows the calculation algorithm 700 to compute a cash flow match for the individual spending plan. In the example embodiment provided within FIG. 9, the individual spending plan cash flow match is computed for payments over the period 900. It should be understood though, that any possible term may be used. The calculation algorithm 700 calculates the investment needed in a particular component fund (in this example embodiment a defined maturity fund) to generate the cash flow required by the individual spending plan. As seen in table A 905 of FIG. 9, the example embodiment represents a user-defined period 900. The user in this example provided inputs to the individual spending plan of either a periodic cash draw amount, or a total cash draw amount for the period 900. The calculation engine 700, then in table B 910, determines the amount to invest in a particular underlying fund to generate the periodic cash flow by the user in a particular period. In table C 915, coupon payments, bond interest payments, or bond coupons are accounted for by the calculation algorithm 700. The coupon payments, bond interest payments, or bond coupons are then applied from the later years of a particular year. Column D 920 provides a cash flow amount of the coupon and maturity of a current period 900. In situations where the expected coupon payments, bond interest payments, or bond coupons exceeds the required cash flow for a particular period, then no investment corresponding to that period is purchased by the asset management system 100. Column E 925 provides for a total amount of cash flow of the underlying fund generated for a particular period. Column F 930 provides for excess cash flow that is generated in a particular period with respect to the user specified cash flow for that same period.

Viewing FIG. 10, the calculation algorithm 1000 also adjusts for an over-purchase amount of the representative component fund. If the total cash flow for the specific component fund (i.e. defined maturity fund or DMF) generated by the calculation algorithm 700 in the previous step exceeds the specified individual spending plan cash flows identified by the user, the component fund may be scaled to accommodate this overage. As seen in the example embodiment of FIG. 10, the final component fund investment amounts are scaled by a ratio 1005 of the present value 1000 of the individual spending plan cash flows to the total investment amount previously calculated. This presents an adjusted investment amount 1010 for each year to be allocated to the select component fund for that particular year. The adjusted investment amount 1010 value and calculation occurs only if coupon payments generated by the component fund exceed the cash flow required in a particular year.

As viewed in FIG. 11, step three allows the calculation algorithm 700 to determine a blend of component funds that most closely matches the interest rate sensitivity of the remaining liability. This can include any residual cash flows from step two discussed above, as well as future term years if they are applicable. For example, the embodiment shown in FIG. 11 shows a ten-year term for the individual spending plan, but cash flows for years eleven and onward can be part of this calculation. To calculate the residual cash flow 1100 for the term of the individual spending plan, the calculation algorithm compares user specified individual spending plan cash flows 1105 from the component accounts against the expected cash flows for the component accounts generated by the final investment amounts 1110 calculated in step two. The result is the residual cash flow 1100 for a specific component account during a periodic interval of the individual spending plan. The calculation algorithm 700 then combines the residual cash flows 1100 for the period specified by the individual spending plan with subsequent or additional cash flows outside the set period of the individual spending plan. This result gives the calculation algorithm 700 the remaining liability of the individual spending plan. The remaining liability cash flows are then converted to a dollar sensitivity to a one basis point change in rate "DV01" with the following equation where PV is the present value and D equals duration: $DV01(CF_t) = PV(CF_t) \times D(CF_t)$. Next, the calculation algorithm 700 converts the component funds' cash flows to a contribution to duration ("CTD"). This is accomplished with the following equation:

$$CTD(CF_t) = \frac{PV(CF_t) \times D(CF_t)}{\text{Fund Investment Amount}^*}$$

The cash flows for the component funds are then normalized to a $1 dollar investment. Next, the calculation algorithm 700 optimizes an objective function of the individual spending plan. The objective function is used to determine fund investment amounts ($ Investedt) that minimize duration and yield curve mismatch versus the remaining liability. This is accomplished by the following equation where ($ Investedt) is subject to the condition of being greater than or equal to zero $$\sum_{t=1}^{30} \left| LDV01_t - \sum_{f=1}^{n} (CTD_{f,t}/10,000)(\$Invested_f) \right|$$

FIG. 12 shows step four and the final processing step of the calculation engine 545 where the calculation engine 545 outputs the combined component funds to create the target portfolio 600 requested by the user's desired inputs into the asset management system. As seen in FIG. 12, the portfolio total 1200 for each component fund is viewed based on the calculations from the earlier steps 1205 of the processing algorithm. From there, the total portfolio 1200 of the component funds is calculated. After the total portfolio 1200 is created, the calculation engine 545 can then address the asset management tool 500 to execute buy or sell operation to implement the calculated individual spending plan based on the calculation algorithm's computations.

The calculation engine 545 can also rebalance the individual spending plan as time passes and updated external data sets are available to the calculation engine 545. If the duration mismatch (calculated daily) between the individual spending plan and associated portfolio exceeds established thresholds the asset management tool 500 will run calculations detailed in step four above. The new portfolio will be compared to the existing portfolio and trades will be executed to rebalance to the new target weights.

The calculation engine 545 can also calculate an expected surplus 610 of an individual spending plan. To calculate the surplus investment 610 of the ISP (i.e., the amount by which the current account market value exceeds the expected amount required to generate the ISP payments), the calculation engine 545 generates cash flows for the underlying investment components based on median/$50^{th}$ percentile credit default losses (as opposed to $5^{th}$ percentile as described in step one above). The investment amount required to meet the ISP based on these assumed underlying cash flows is then calculated following the logic from step four. The expected surplus 610 is the difference between the investment amount required to meet the ISP at the $5^{th}$ percentile and the median/$50^{th}$ percentile.

Figure 13:
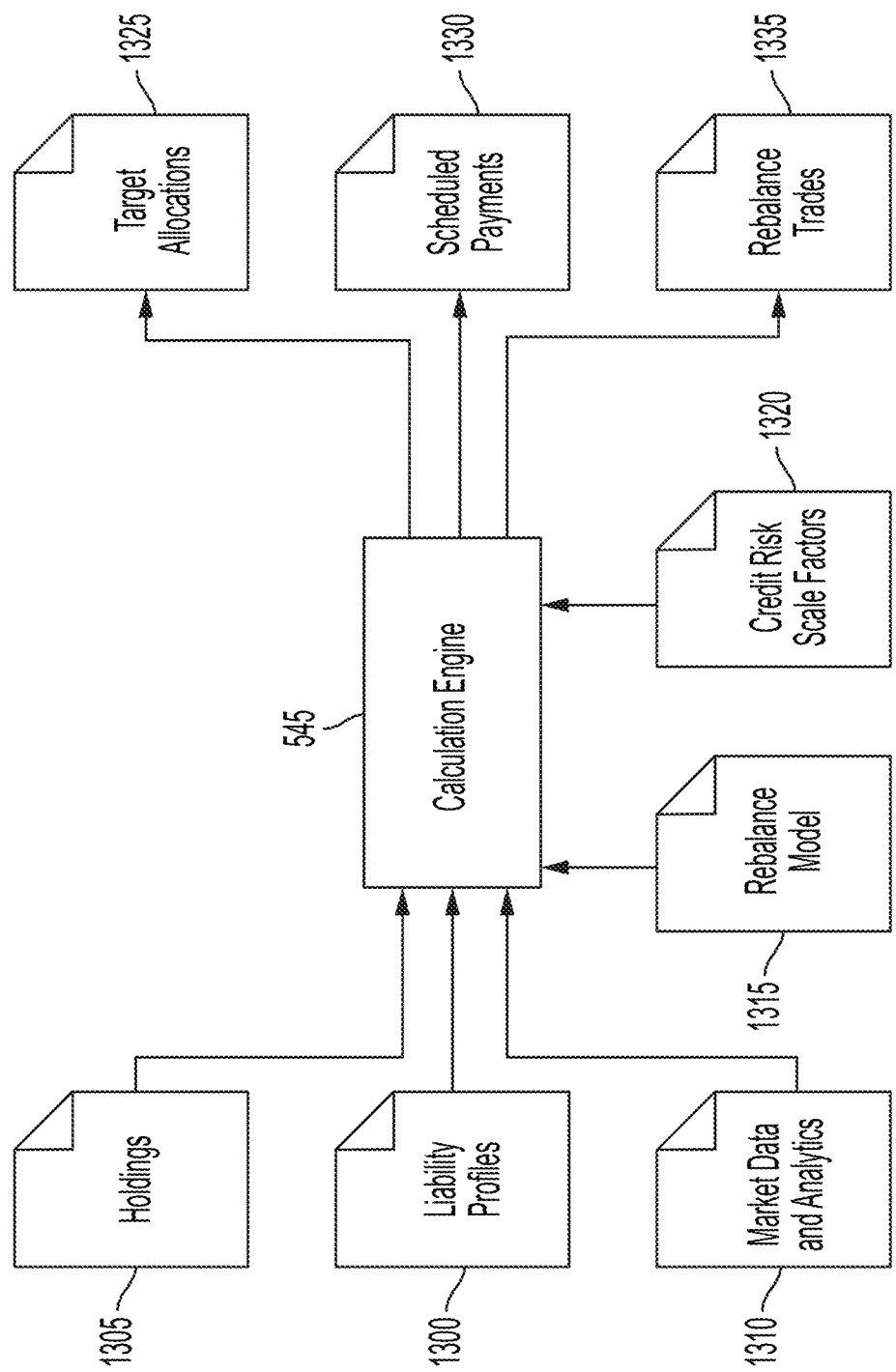
FIG. 13 illustrates inputs and outputs of the calculation engine in a management task setting in accordance with an embodiment of the disclosure.

The second main function of the calculation engine 545 is to provide account management of a previously created liability profile of the end user. FIG. 13 shows inputs and outputs of the calculation engine 545 that are needed to accomplish these management tasks. For each account, the asset management tool 500 will transform each participant's individual liability profile 1300, current holdings 1305, and market data and analytics 1310 into a set of allocation percentages and a set of defined maturity bond funds or any other underlying asset previously described. The calculation engine 545 of the asset management tool 500 will then utilize a rebalance model 1315 to periodically adjust these allocation percentages and submit any necessary rebalance trade orders including sell instructions associated with scheduled distributions associated with the liability profile 1300 to an outside financial database such as but not limited to a custodial platform. The calculation engine 545 may also utilize credit risk scale factors 1320 as part of the inputted data to operate the calculation engine 545 in creating the optimized liability profile 1300 and for appropriate rebalancing of the liability profile 1300.

To accomplish this second task of account management, several inputs are required to enter the calculation engine 545 to perform the necessary computations. First, the liability profile 1300 previously calculated by the calculation engine 545 is inputted back into the calculation engine 545 for management purposes. As stated above, the liability profile 1300, which may be visible on the graphical user interface of the end user, shows the set the estimated payment amounts and payout dates computed by the calculation engine 545. The liability profile 1300 consists of a payment schedule 1330 and an expected surplus investment. The surplus investment constitutes any remaining balance estimated to be in the account and incorporates both unused assets and capital appreciation at the end of the payment schedule 1330. Holdings 1305 of the liability profile 1300 are also inputted into the calculation engine 545 for liability profile management. The holdings 1305 represent units held in an individual asset or investment account of one or more defined maturity funds, various debt securities, and/or cash as of a specific date. Market data 1310 is also electronically received and/or inputted into the calculation engine 545 for liability profile management. The market data 1310 represents the price of each underlying asset as of a specific date. Analytics 1310 are also inputted into the calculation engine 545 for liability profile management. The analytics 1310 are calculations processed by the asset management tool 500 that represent the actual and/or calculated duration of each defined assets, maturity fund, or investment, as well as the liability profile 1300, as of a specific date.

The calculation engine 545 can also account for the liquidity required to meet the liability payments directed by the Individual Spending Plan. The calculation engine 545 can establish the minimum amount of cash required in the portfolio to make any payments due to the participant as-of the date of calculation.

Once the required inputs are entered into the asset management tool 500, the calculation engine 545 begins its computational work to manage the liability profile 1300. The calculation engine 545 processes the necessary inputs to create a target asset allocation 1325 of each individual asset of the liability profile 1300. The calculation engine 545 then can utilize a rebalance model 1315 or algorithm to recommend rebalance trades 1335 for each individual asset to properly balance the liability profile 1300 to the wishes of the end user of the account. Afterwards, the calculation engine 545 outputs two main sources of information: target allocations 1325 and rebalance trades 1335. The output of target allocation 1325 is the result of the calculations of the calculation engine 545 that result in the optimal asset allocations in percentages, to defined assets, maturity funds, debt securities, and/or cash for the liability profile 1300 as of a specific date. The cash component of the target allocations 1325 is inclusive of any payments or liquidity needs determined by the individual spending plan. The output of rebalance trades 1335 determines trades between underlying holdings 1305 for each liability profile 1300 of the account to move actual asset allocations closer to the target allocations 1325. The rebalance trades 1335 can then be communicated by the asset management tool 500 to the financial databases to execute the trades determined to optimize the liability profile 1300. The calculation engine 545 can also output the scheduled payments 1330 of the liability profiles 1300 created by the calculation engine 545, utilizing cash raised as part of the rebalance process. Once complete, the liability profile 1300 is deemed to be in a correct and optimal condition so that the payment disbursements over the predetermined period are in line to be met.

The third main function of the calculation engine 545 is to calculate a surplus utilization rate 615 for the Individual Spending Plan. This surplus utilization rate 615 represents the expected utilization of the surplus amount calculated at the inception of the plan over time throughout the life of the Individual Spending Plan. The expected utilization of the surplus at any time t is calculated by adding the net surplus expected up to that point to the net present value of future surplus expectations:

$$S_t = \sum_{u=1}^{t-1}(d_u - m_u) + PV_t\left(\sum_{u=t}^{n}PV_u(d_u - m_u)\right)$$

Where $S_t$ is the surplus at time t, n is the total number of periods in the term of the spending plan from inception to final payment (termination), $d_u$ is the surplus at the desired confidence interval at time u, $m_u$ is the surplus at the median confidence interval at time u, and $PV_t$ and $PV_u$ are functions that calculate the present value of future cash flows at times t and u, respectively. To calculate the full surplus utilization rate 615, $S_t$ is evaluated for each period (for example, monthly) from spending plan inception through the date of the terminal payment (period n).

Once a personalized surplus utilization rate 615 has been established for an Individual Spending Plan, the calculation engine 545 will calculate actual surplus amounts each day as time progresses. The calculation engine 545 will then track deviation of actual surplus amounts from the estimated surplus 610 in the initial surplus utilization rate 615 calculation as time progresses. For any deviations in actual surplus amount, the calculation engine 545 can calculate attribution to determine the relative sources of those deviations. The actual surplus amounts relative to the surplus utilization rate 615, along with any relevant attribution data, can be displayed by the user interface.

Figure 14:
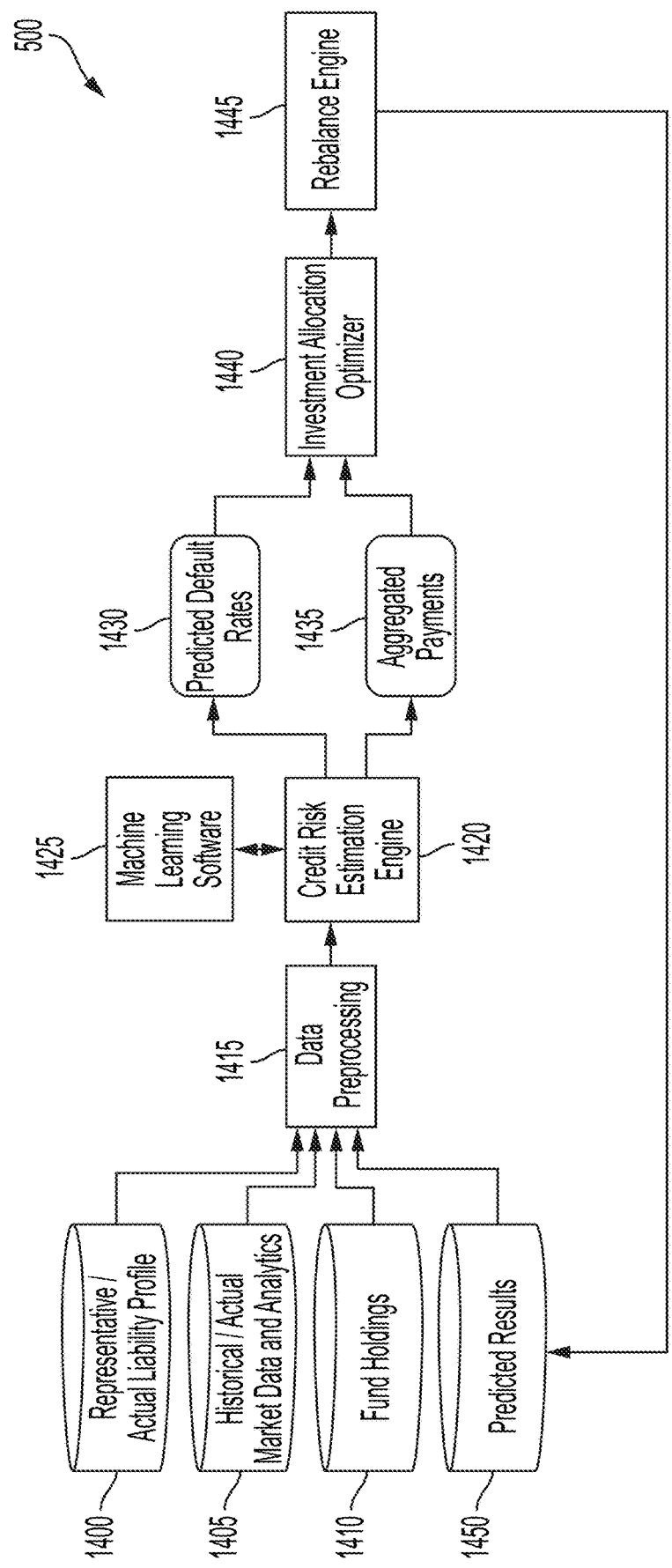
FIG. 14 illustrates a machine learning software flowchart for use with the asset management tool in accordance with an embodiment of the disclosure.

To aid the calculation engine 545 in its computational processing, machine-learning software may be used to create an optimal model based on learned trends and successful asset investments. As seen in FIG. 14, a flow chart of how information flowing through the asset management tool 500 for use with machine learning software to refine the data outputted by the calculation engine 545. The asset management tool 500 may use machine-learning software 1425 to help implement a decision tree as to whether or not to rebalance for a specific liability account. Input offered by the end user of the account will help determine if a specific liability profile is a candidate for rebalancing based on the closeness of the specific liability profile to a representative liability profile created by the machine learning software. The asset management tool 500 may input certain parameters into the machine learning software to create the representative liability profile used for comparison. These inputs include historical market data and analytics 1405 to train and improve the machine learning software for rebalance decisions. Inputs also include representative and actual liability profiles 1400 of the end users of accounts stored within the asset management tool 500. Fund holding information 1410 for third party sources can also be inputted to train and improve the machine learning software for rebalancing decisions. The asset management tool 500 may also use machine learning to predict the value of dividend payments to be distributed by each defined maturity fund based on an assessment of coupon payments and maturities of underlying debt instruments. This assessment of dividend payments, in combination with the closeness of a dividend payment to a scheduled payment, may also be input to determine the rebalance decision tree. Additionally, predicted results 1450 based on the representative and actual liability profiles 1400 and how they should perform over time are inputted into the machine learning software. Before all of these inputs enter the machine learning software, pre-processing of data 1415 occurs to put all of these inputs into a common data structure for execution and computational processing by the machine learning software 1425. From there, the machine learning software 1425 creates a representative liability profile with the inputted information. That machine learning software 1425 can be in communication with a credit risk estimation engine 1420 to help develop and calculate predicted results of a rebalancing module. The rebalancing module may utilize outputs of the credit risk estimation engine 1420 to create predicted default rates 1430 and predicted dividends for the liability profile as well as aggregated payments 1435. The representative liability profile is compared to the actual liability profile of the end user of the account and the rebalance model may execute the redistribution of investment assets through the investment allocation optimizer 1440 based on a predetermined threshold of deviation between the actual and representative liability profile. Afterwards, the rebalance engine 1445 finishes up recommendations in the management of the actual liability profile, the results are outputted to the end user for viewing on the graphical user interface. The predicted results 1450 from the rebalance engine 1445 itself can also be used as an input to the machine learning software 1425 given that the specific sets of parameters used in the lasted iteration may improve the machine learning software 1425.

As discussed earlier, the graphical user interface outputted by the asset management tool 500 is an important advancement of the asset management system 100. The graphical user interface presents an easy to understand and comprehend arrangement of data pertaining to a liability profile of an end user of an account. Current systems are analog, extremely complex, and do not offer visual assistance to the end user of any type of liability profiles. The graphical user interface gives the end user an easy to read, easy to access, and easy to control electronic representation of their specific liability profile without extensive backend calculations or information processing.

Figure 15:
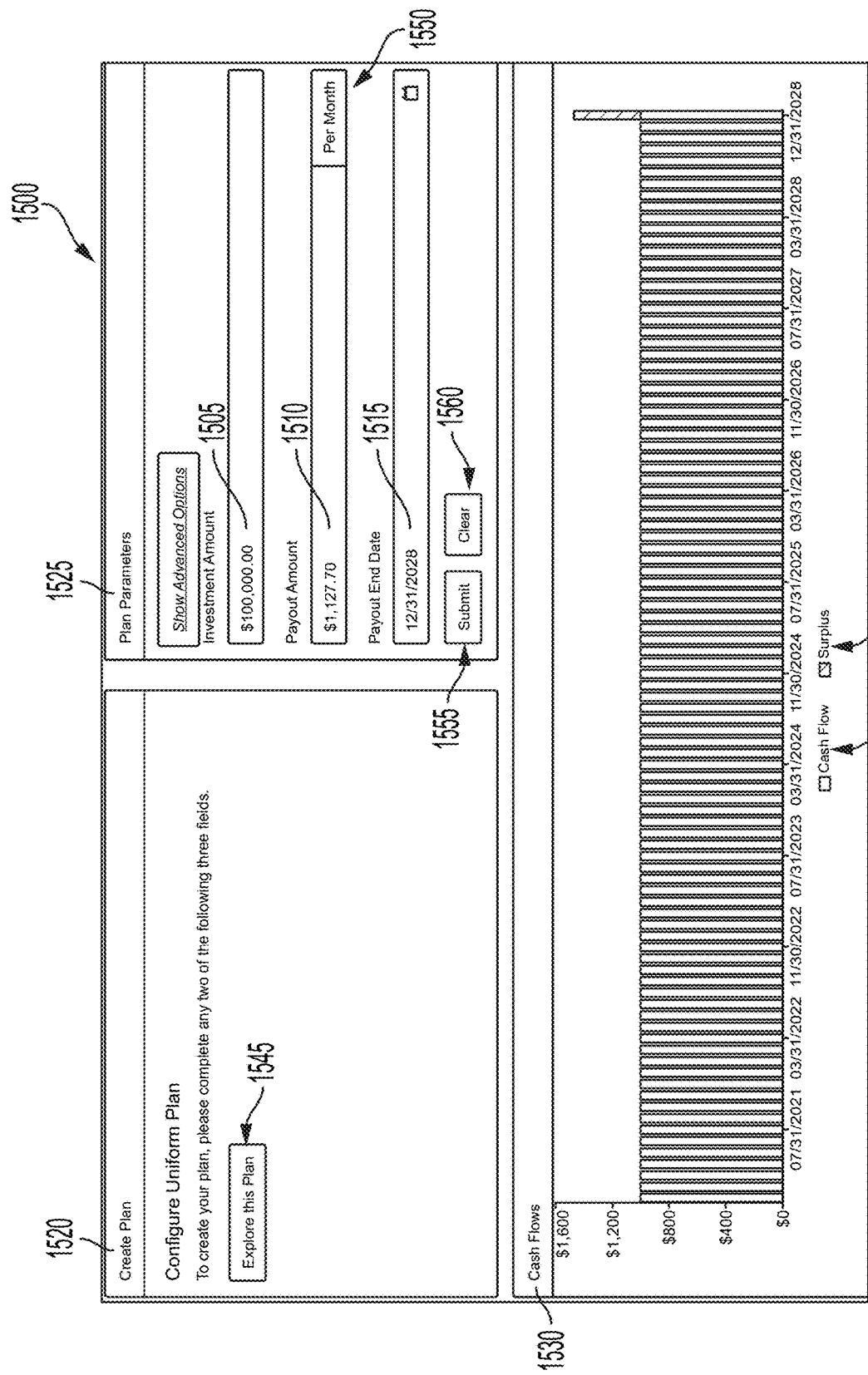
FIG. 15 illustrates an example graphical user interface of a uniform distribution model of the asset management tool in accordance with an embodiment of the disclosure.

FIG. 15 shows and example graphical user interface which may be visible to an end user of an account selecting a uniform distribution of assets 1500. In a create plan panel 1520, the type of liability profile/ISP can be toggled by the end user between accessible distribution options (e.g. uniform or non-uniform payouts). To access additional information about the selected uniform distribution of assets 1500 plan, the end user can select an "Explore the Plan" button 1545 within the create plan panel 1520 for more detailed plan information and breakdowns. For a uniform distribution of cash flows the end user of the account will use the graphical user interface to input known parameters of their liability profile/ISP. Within a plan parameters panel 1525, these inputs may represented to the end user and include a date of first payment, an initial investment amount 1505, a date of end payment 1515, or an estimated monthly payment 1510. Not every input is needed to complete the liability profile by the calculation engine 545. Only two of the three inputs of an initial investment amount 1505, a date of end payment 1515, or an estimated payment 1510 are needed and the asset management tool 500 will solve for the unknown parameter. In some example embodiments, the end user can toggle the period of time for the estimated payment 1510 between selected time period (e.g. monthly, yearly, etc.) with a "Payout Period" button 1550. The end user can then select either select a "Submit" button 1555 or a "Clear" button 1560 to create the desired uniform distribution plan based on the inputted parameters or to reenter input information necessary for creation of a uniform distribution plan. The graphical user interface can allow the end user to plan for an initial investment, or assess the impact of changing parameters to their estimated series of cash flows. The graphical user interface can also display both the cashflow 1535 and any surplus investment 1540 in a cash flow panel 1530. The surplus investment 1540 is subsequent to investment in the liability profile that would be added to the final payment in the cash flow series. The graphical user interface can show schedule payment dates and the uniform amount of those payments to be provided at the determined dates. Finally, the graphical user interface can provide the user with portfolio yield based on the determination of the calculation engine 545 of the asset management tool 500.

Figure 16:
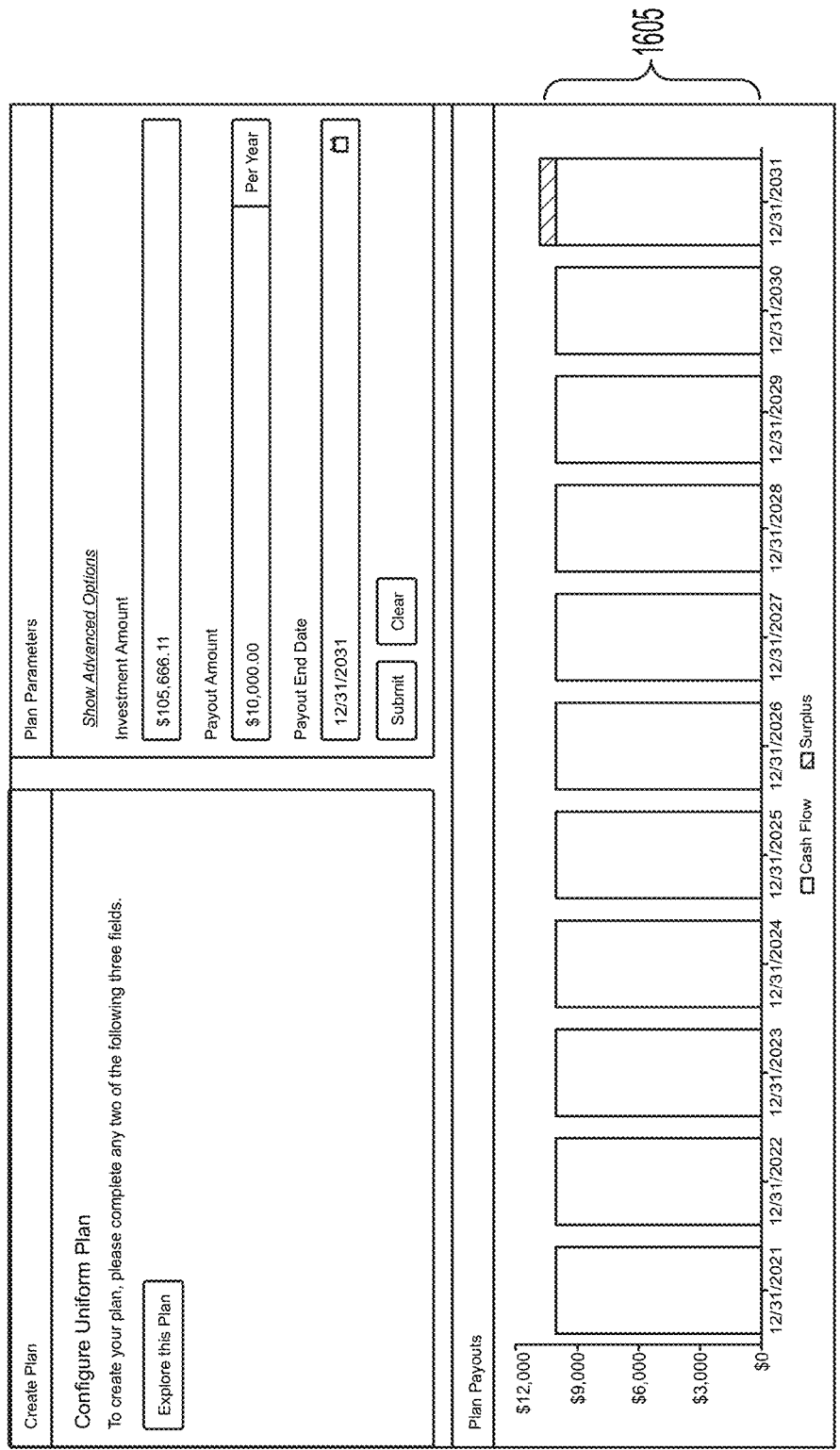
FIG. 16 illustrates another example graphical user interface of a uniform distribution model of the asset management tool in accordance with an embodiment of the disclosure.

FIG. 16 illustrates another example graphical user interface of a uniform distribution model of the asset management tool 500 showing a uniform plan inception 1600. The graphical user interface viewed in this example embodiment contains the same panels and user activated buttons as seen above in FIG. 15. This example uniform plan inception 1600 illustrations shows a yearly period of distributions as opposed to a monthly period of distribution shown in FIG. 15. Thus, the plan payouts panel (also known as the cash flow panel 1530) may provide easier visual information to the end user viewing cash flow 1535 and the surplus investment 1540. The plan payouts are viewed in a graphical bar chart form 1605 wherein the cash flow 1535 is viewed below the surplus investment 1540.

Figure 17:
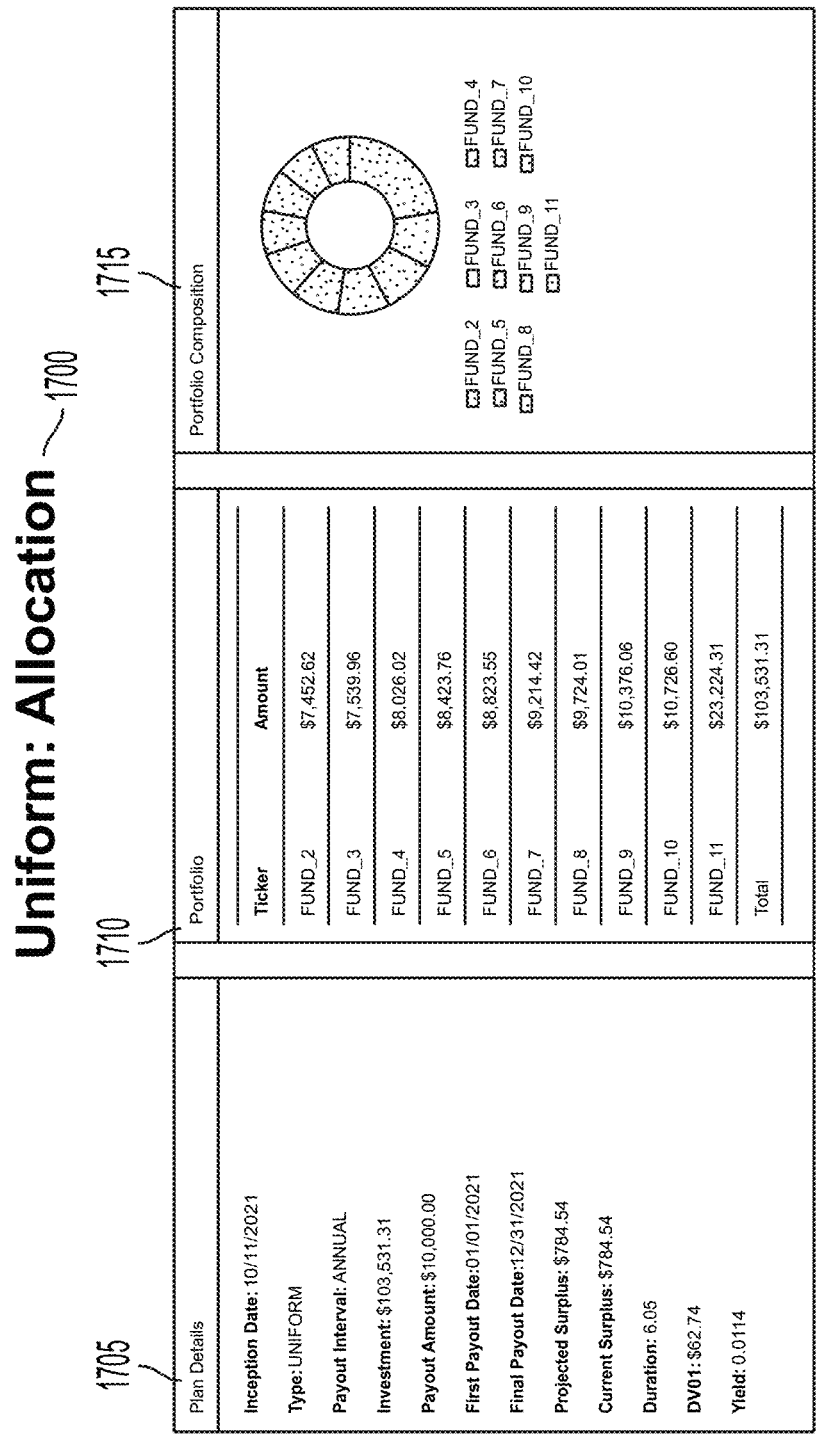
FIG. 17 illustrates an example graphical user interface showing allocated assets in a uniform distribution model of the asset management tool in accordance with an embodiment of the disclosure.

FIG. 17 illustrates an example graphical user interface showing uniform: allocation 1700 of the assets in a uniform distribution model of the asset management tool 500. This uniform: allocation 1700 screen may be accessible from the original graphical user interface shown to the user when the uniform distribution of assets 1500 or 1600 is created by the end user. The uniform: allocation 1700 screen contains a plan details panel 1705, a portfolio panel 1710, and a portfolio composition panel 1715. The plan details panel 1705 can provide the end user with detailed information related to the selected and created uniform distribution of assets plan. Such information may include, but is not limited to inception date of the plan, type of selected plan, payout interval of the plan, total investment amount in the plan, payout amounts of the plan, first payout date for the plan, final payout date for the plan, projected surplus of the plan, current surplus of the plan, duration of the plan, dollar sensitivity to a one basis point change in rate of the plan, and yield percentage of the plan. Of course, other detailed information of the associated plan can also be viewed and displayed to the end user. The portfolio panel 1710 sets up the multiple different funds used and invested in to execute the desired plan of the end user. The listed funds also include representative amounts currently held and invested in each fund for execution of the plan. The portfolio composition panel 1715 shows the end user a graphical representation of the multiple funds used to create the desired and executed investment plan. As show in the example embodiment, the portfolio of funds is viewed as a circular pie based chart, but it should be understood that other types of graphical representations are possible for representation.

Figure 18:
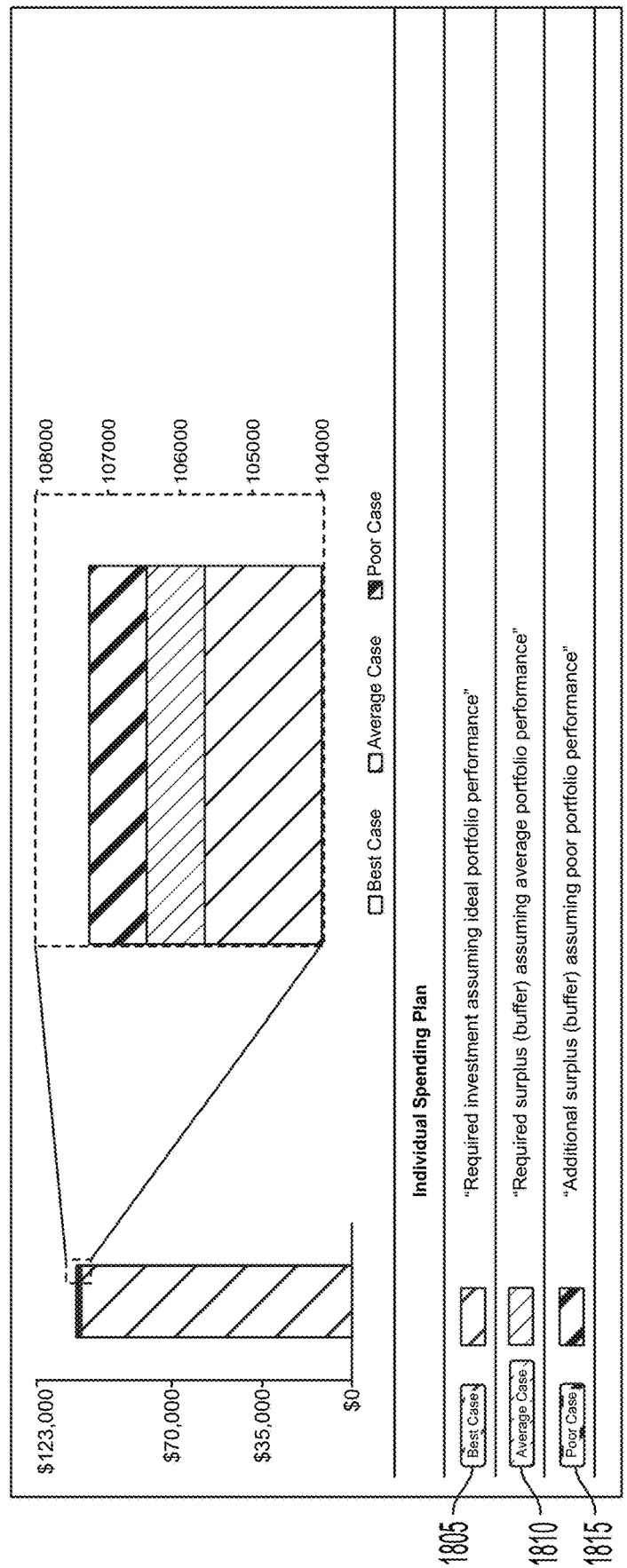
FIG. 18 illustrates an example graphical user interface showing surplus breakdown in a uniform distribution model of the asset management tool in accordance with an embodiment of the disclosure.

FIG. 18 illustrates an example graphical user interface showing uniform: surplus breakdown 1800 in a uniform distribution model of the asset management tool 500. The graphical user interface can display to the user the investment including surplus investment 1540 that would be required to predictably meet the liabilities of the uniform Spending Plan (i.e., payout according to the uniform distribution schedule). The uniform: surplus breakdown 1800 shows detailed information related to the surplus investment 1540 in the uniform model. The surplus investment 1540 can further be broken down and viewed as a best case 1805, average case 1810, and poor case 1815 during the plans execution. The best case 1805 amount of the surplus investment 1540 is the required investment assuming ideal portfolio performance. The average case 1810 amount of the surplus investment 1540 is the required surplus (buffer) assuming average portfolio performance. The poor case 1815 amount of the surplus investment 1540 is additional surplus (buffer) assuming poor portfolio performance. The surplus investment 1540 itself can further be viewed in a bar chart broken down between the best case 1805, average case 1810, and poor case 1815 scenarios.

Figure 19:
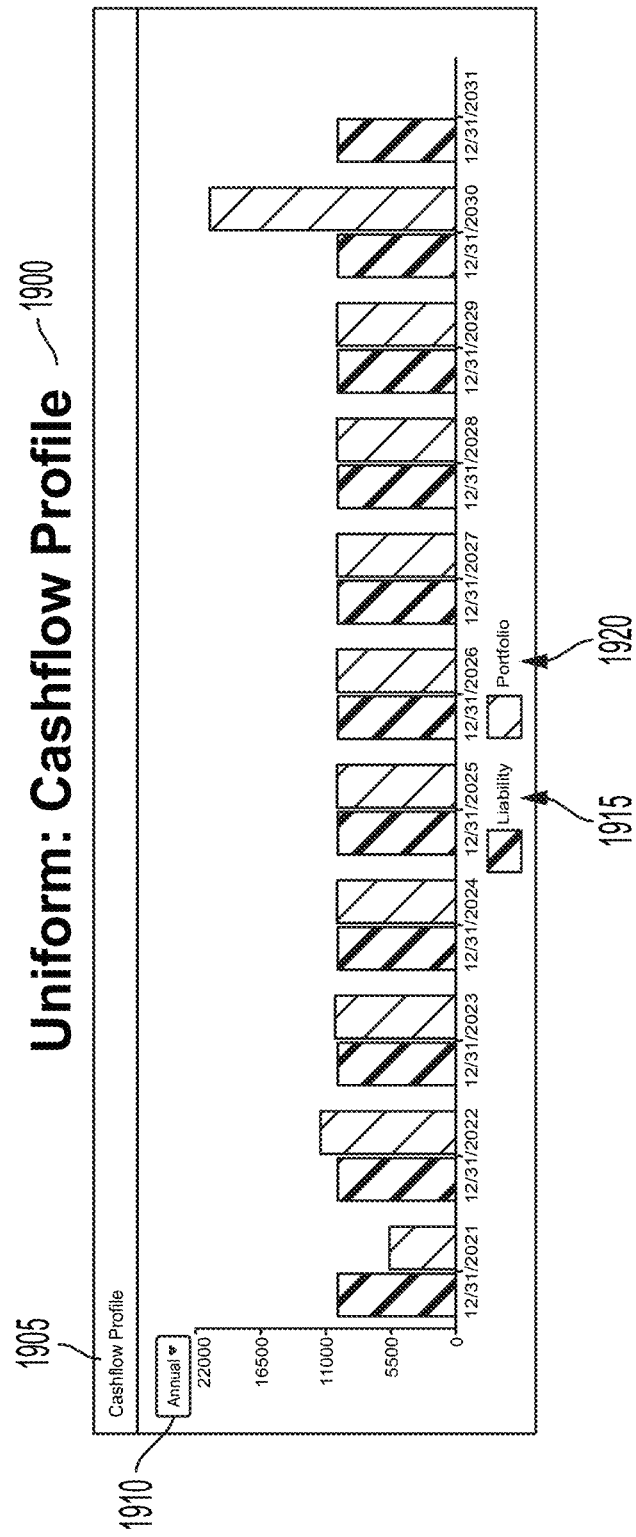
FIG. 19 illustrates an example graphical user interface showing a cashflow profile in a uniform distribution model of the asset management tool in accordance with an embodiment of the disclosure.

FIG. 19 illustrates an example graphical user interface showing a uniform: cashflow profile 1900 in a uniform distribution model of the asset management tool 500. The graphical user interface can display the projected liabilities (scheduled payouts) of the spending plan adjacent to the projected cash flows generated by the generated portfolio so as to compare expected inflows and outflows for a uniform spending plan. Projected cash flows generated by the portfolio and scheduled plan payouts may not align as income-driven investing utilizes a combination approach to mitigate interest rate risk (i.e., cashflow and duration match). The uniform: cashflow profile 1900 can be panel 1905 showing the cashflow of the uniform distribution model over a period of time. A cashflow toggle button 1910 may be present wherein the end user can toggle the period of viewed payments showing cash flow 1535 over a set period of time (e.g. monthly, yearly, etc.) Furthermore, the cash flow 1535 can be broken down into each liability metrics 1915 and portfolio metrics 1920. Each the liability metrics 1915 and the portfolio metrics 1920 can be visible to the end user in a graphical format over the selected period for payouts defined by the end user.

Figure 20:
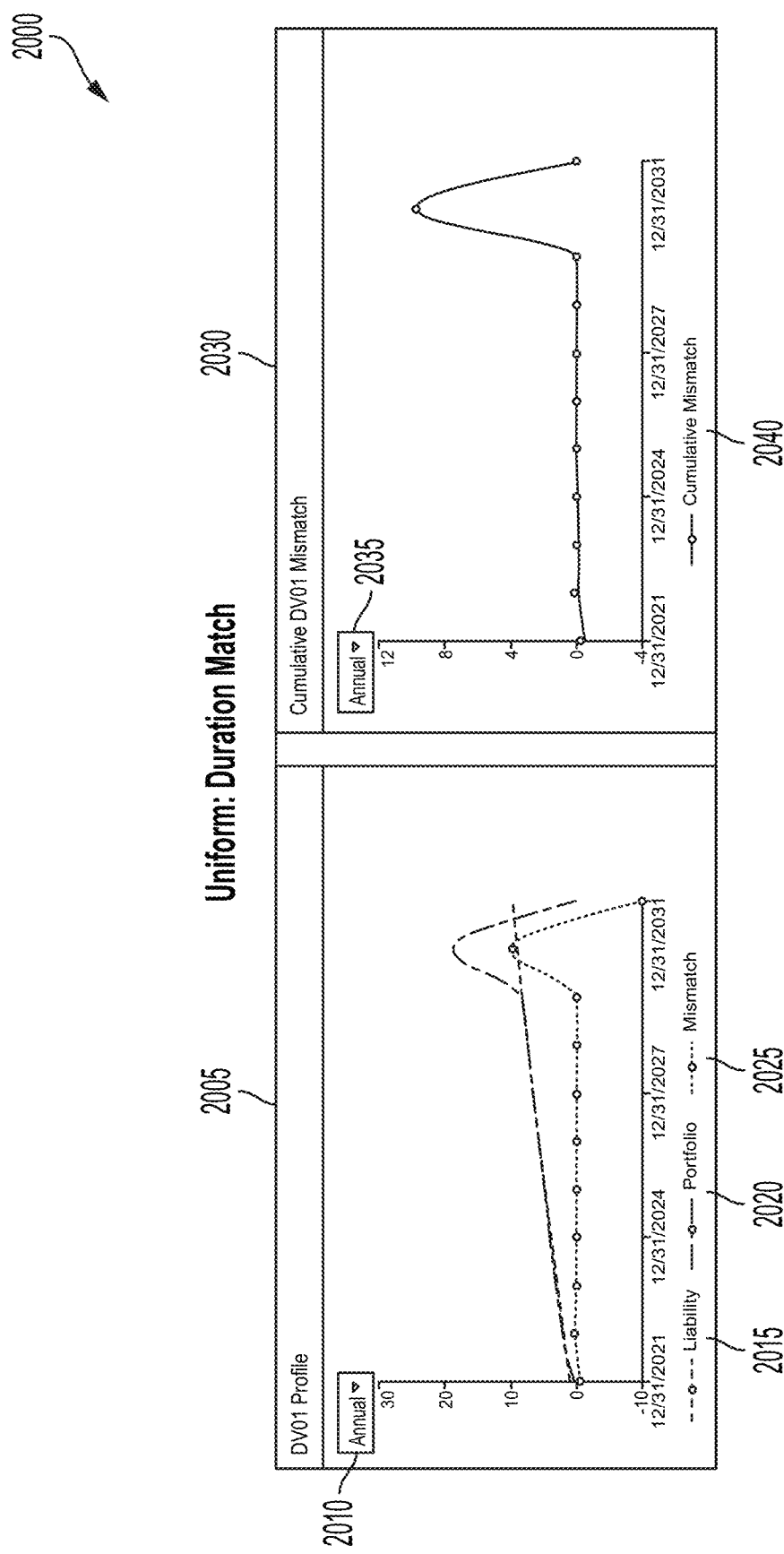
FIG. 20 illustrates an example graphical user interface showing a duration match in a uniform distribution model of the asset management tool in accordance with an embodiment of the disclosure.

FIG. 20 illustrates an example graphical user interface showing a uniform: duration match 2000 in a uniform distribution model of the asset management tool 500. The graphical user interface can display the dollar value of a basis point (DV01) of the liability as compared to the DV01 of the portfolio within a uniform spending plan, along with the amount by which they match or do not match, over time. This comparison can be illustrated by the graphical user interface in both point-in-time and cumulative measurements. The uniform: duration match 2000 can contain two different panels showing activity of the profile over a set period of time: a DV01 profile panel 2005 and a cumulative DV01 mismatch panel 2030. Within the DV01 profile panel 2005, period toggle button 2010 may be present wherein the end user can toggle the period of viewed payments showing information related to the created plan over a set period of time (e.g. monthly, yearly, etc.) During the selected period of time, liability data points 2015, portfolio data points 2020, and mismatch data points 2025 can be charted and interconnected to view a graphical representation of the DV01 profile over the selected period of time. Within the cumulative DV01 mismatch panel 2030, a mismatch period toggle button 2035 may be present wherein the end user can toggle the period of viewed DV01 mismatch information related to the created plan over a set period of time (e.g. monthly, yearly, etc.) During the selected period of time, cumulative mismatch data points 2040 can be charted and interconnected to view a graphical representation of the cumulative mismatch over the selected period of time.

Figure 21:
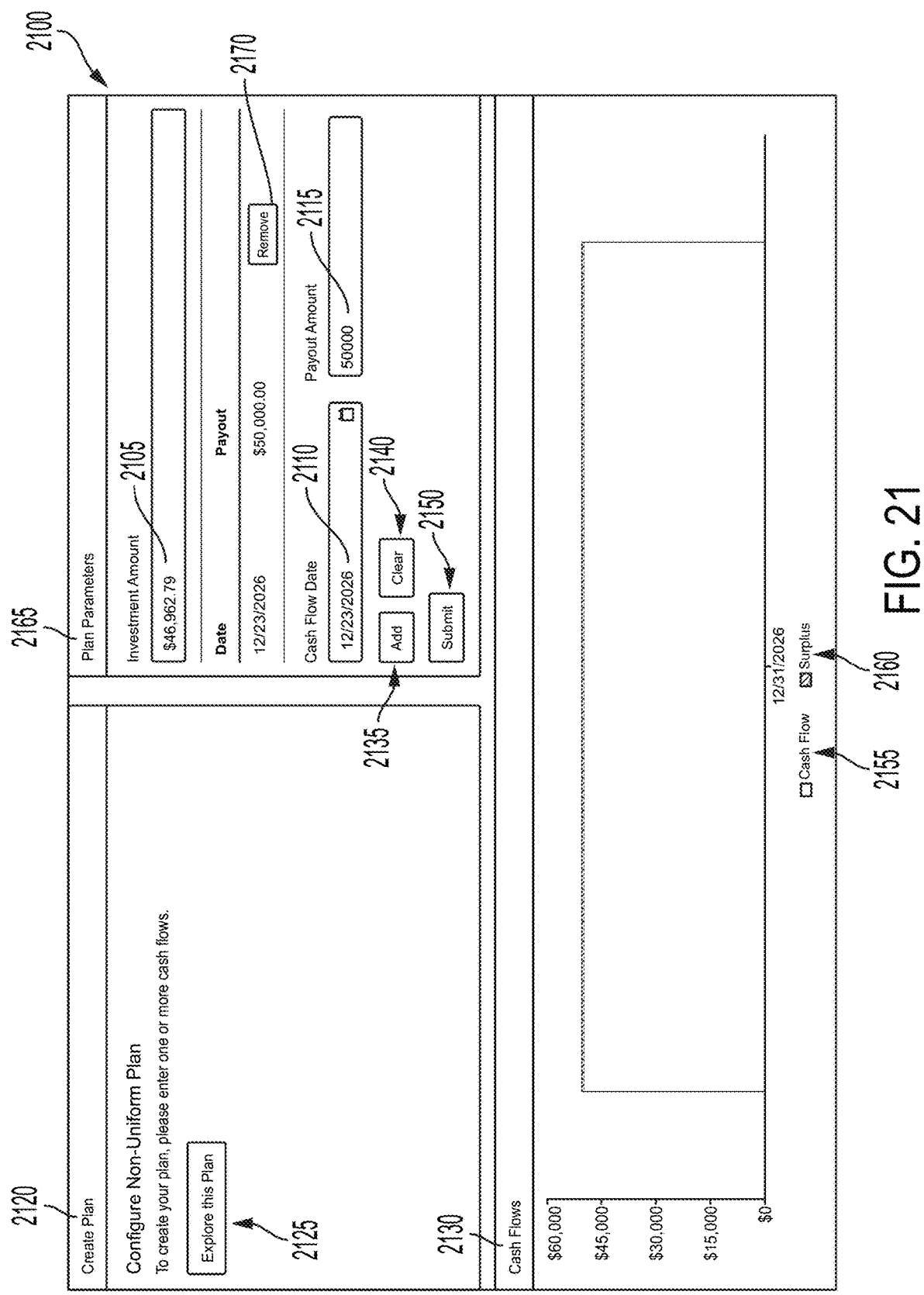
FIG. 21 illustrates an example graphical user interface of a non-uniform distribution model of the asset management tool in accordance with an embodiment of the disclosure.

FIG. 21 shows and example graphical user interface which may be visible to an end user of an account selecting a non-uniform distribution of assets 2100. General information regarding the non-uniform distribution of assets 2100 plan can be contained within a create plan 2120 panel with a selectable "Explore this Plan" 2125 where the end user can access additional information related to the created or general non-uniform distribution of assets 2100. To access additional information about the selected non-uniform distribution of assets 2100 plan, the end user can select an "Explore the Plan" button 2125 for more detailed plan information and breakdowns. For a non-uniform series of assets and cash flows, the end user of the account may use the graphical user interface to input known cash flow needs along with the dates on which payment is requested. The validation of these requests may be subject to terms and conditions set forth the financial databases in communication with the asset management tool 500. Within a plan parameters panel 2165, the end user may be able to input a desired investment amount 2105, a desired cashflow date 2110, and a desired payout amount 2115. To verify that such information is allowed, the asset management tool 500 will communication with the financial databases to confirm that such requests are proper before forming the non-uniform liability profile 2100. The asset management tool 500 through the calculation engine will solve for the estimated required initial investment amount. The end user can then select either select a "Submit" button 2140, an "Add" button 2135, or a "Clear" button 2140 to create the desired non-uniform distribution plan based on the inputted parameters or to reenter input information necessary for creation of a non-uniform distribution plan. If the requested payout date is incorrect for whatever reason, the end user has a selectable "Remove" button 2170 to remove the payout date and payout amount associated with the incorrect information. The graphical user interface can also display both the cashflow 2155 and any surplus investment 2160 in a cash flow panel 2130. The graphical user interface will also display any surplus investment 2160 added to the final payment in the cash flow series. In addition to current surplus investment 2160, the graphical user interface will display the surplus investment over time in relation to any expected utilization of surplus. Finally, the graphical user interface can provide the user with estimated portfolio yield based on the determination of the calculation engine 545 of the asset management tool 500.

FIG. 22 illustrates another example graphical user interface of a non-uniform distribution model of the asset management tool 500 showing a non-uniform plan inception 2200. The graphical user interface viewed in this example embodiment contains the same panels and user activated buttons as seen above in FIG. 21. This example non-uniform plan inception 2200 illustration shows a period of distributions selected within the plan parameters panel 2165 as opposed to only the final payout date viewed in FIG. 21. Thus, the plan payouts panel (also known as the cash flow panel 2130) may provide easier visual information to the end user viewing cash flow 2155 and the surplus investment 2160. The plan payouts are viewed in a graphical bar chart form 2205 wherein the cash flow 2155 is viewed below the surplus investment 2160.

Figure 23:
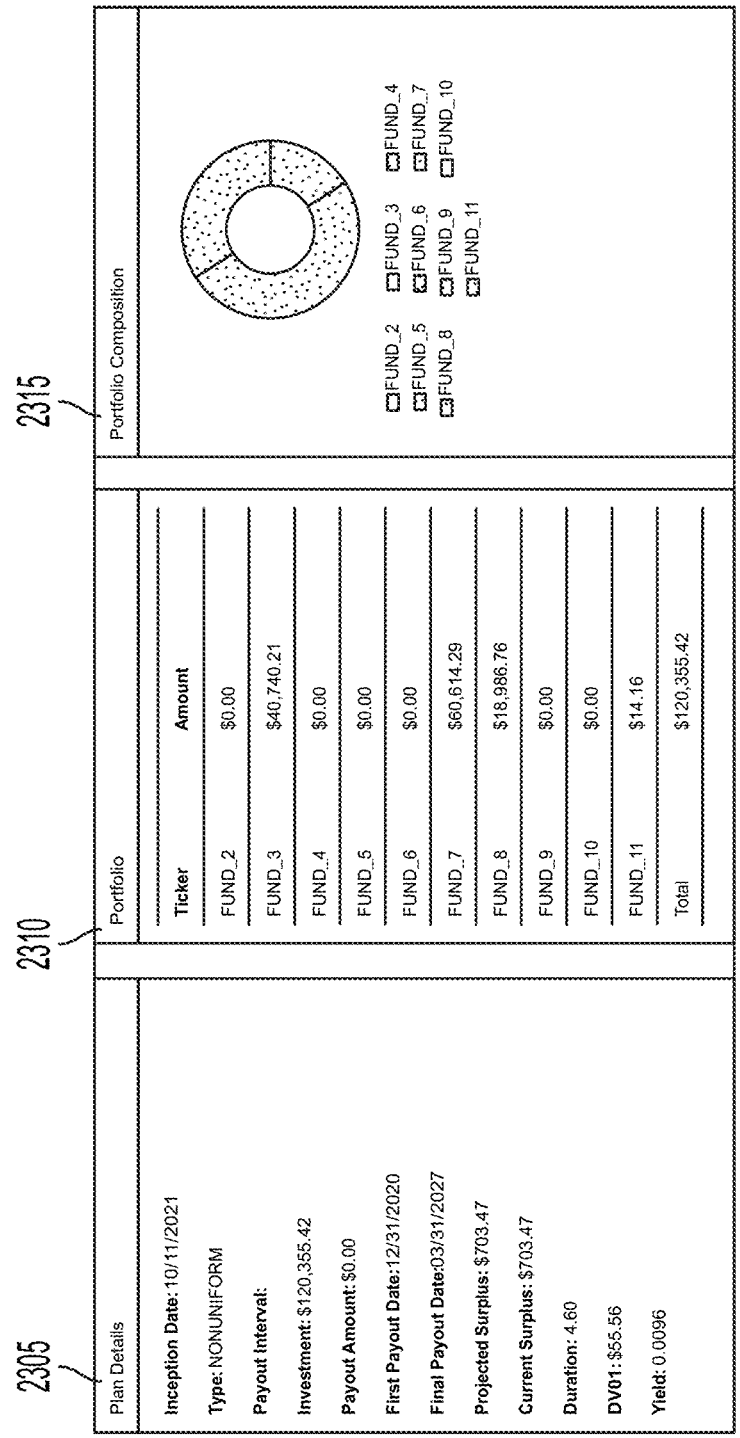
FIG. 23 illustrates an example graphical user interface showing allocated assets in a non-uniform distribution model of the asset management tool in accordance with an embodiment of the disclosure.

FIG. 23 illustrates an example graphical user interface showing non-uniform: allocation 2300 of the assets in a non-uniform distribution model of the asset management tool 500. This non-uniform: allocation 2300 screen may be accessible from the original graphical user interface shown to the user when the non-uniform distribution of assets 2100 or 2200 is created by the end user. The non-uniform: allocation 2300 screen contains a plan details panel 2305, a portfolio panel 2310, and a portfolio composition panel 2315. The plan details panel 2305 can provide the end user with detailed information related to the selected and created non-uniform distribution of assets plan. Such information may include, but is not limited to inception date of the plan, type of selected plan, payout interval of the plan, total investment amount in the plan, payout amounts of the plan, first payout date for the plan, final payout date for the plan, projected surplus of the plan, current surplus of the plan, duration of the plan, dollar sensitivity to a one basis point change in rate of the plan, and yield percentage of the plan. Of course, other detailed information of the associated plan can also be viewed and displayed to the end user. The portfolio panel 2310 tables the multiple different funds used and invested in to execute the desired plan of the end user. The listed funds also include representative amounts currently held and invested in each fund for execution of the plan. The portfolio composition panel 2315 shows the end user a graphical representation of the multiple funds used to create the desired and executed investment plan. As show in the example embodiment, the portfolio of funds is viewed as a circular pie based chart, but it should be understood that other types of graphical representations are possible for representation.

Figure 24:
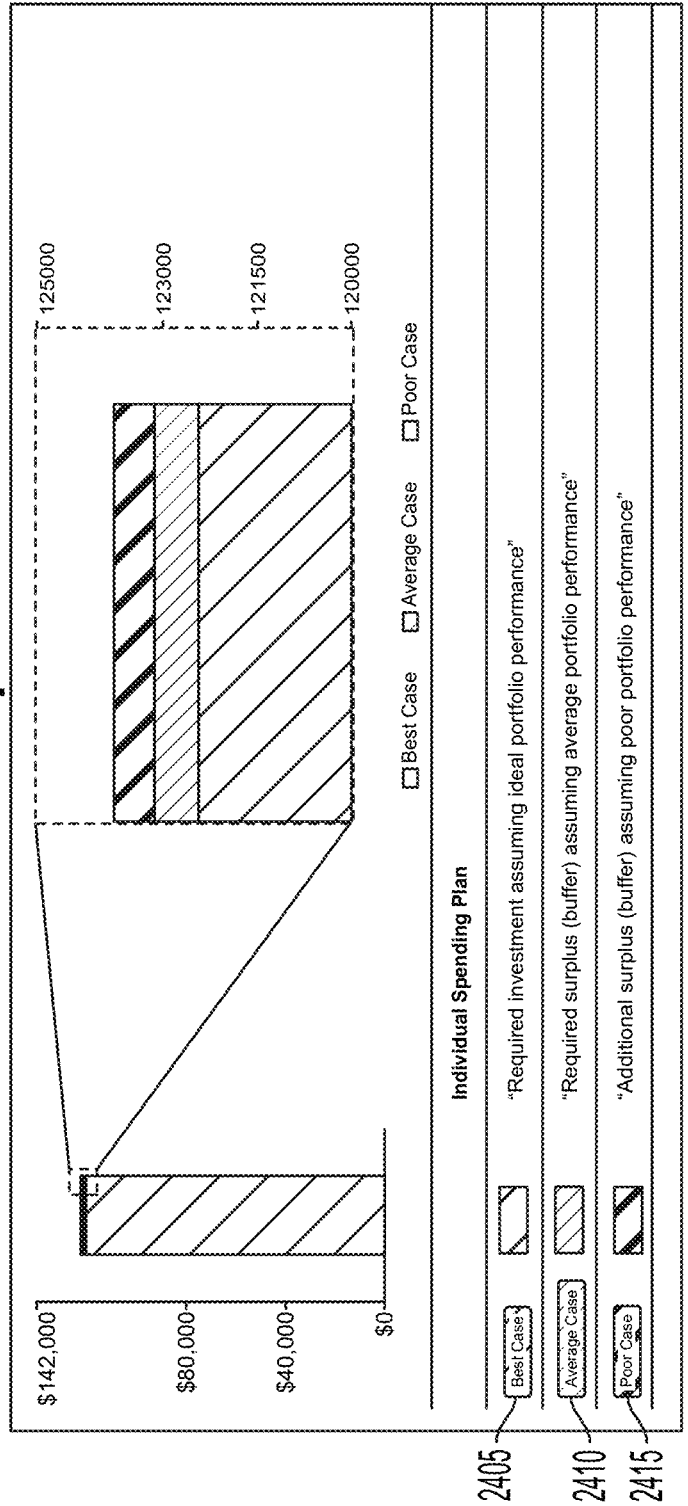
FIG. 24 illustrates an example graphical user interface showing surplus breakdown in a non-uniform distribution model of the asset management tool in accordance with an embodiment of the disclosure.

FIG. 24 illustrates an example graphical user interface showing non-uniform: surplus breakdown 2400 in a non-uniform distribution model of the asset management tool 500. The graphical user interface can display to the user the investment including surplus investment 2160 that would be required to predictably meet the liabilities of the non-uniform Spending Plan (i.e., payout according to the non-uniform distribution schedule). The non-uniform: surplus breakdown 2400 shows detailed information related to the surplus investment 2160 in the non-uniform model. The surplus investment 2160 can further be broken down and viewed as a best case 2405, average case 2410, and poor case 2415 during the plans execution. The best case 2405 amount of the surplus investment 2160 is the required investment assuming ideal portfolio performance. The average case 2410 amount of the surplus investment 2160 is the required surplus (buffer) assuming average portfolio performance. The poor case 2415 amount of the surplus investment 2160 is additional surplus (buffer) assuming poor portfolio performance. The surplus investment 2160 itself can further be viewed in a bar chart broken down between the best case 2405, average case 2410, and poor case 2415 scenarios.

Figure 25:
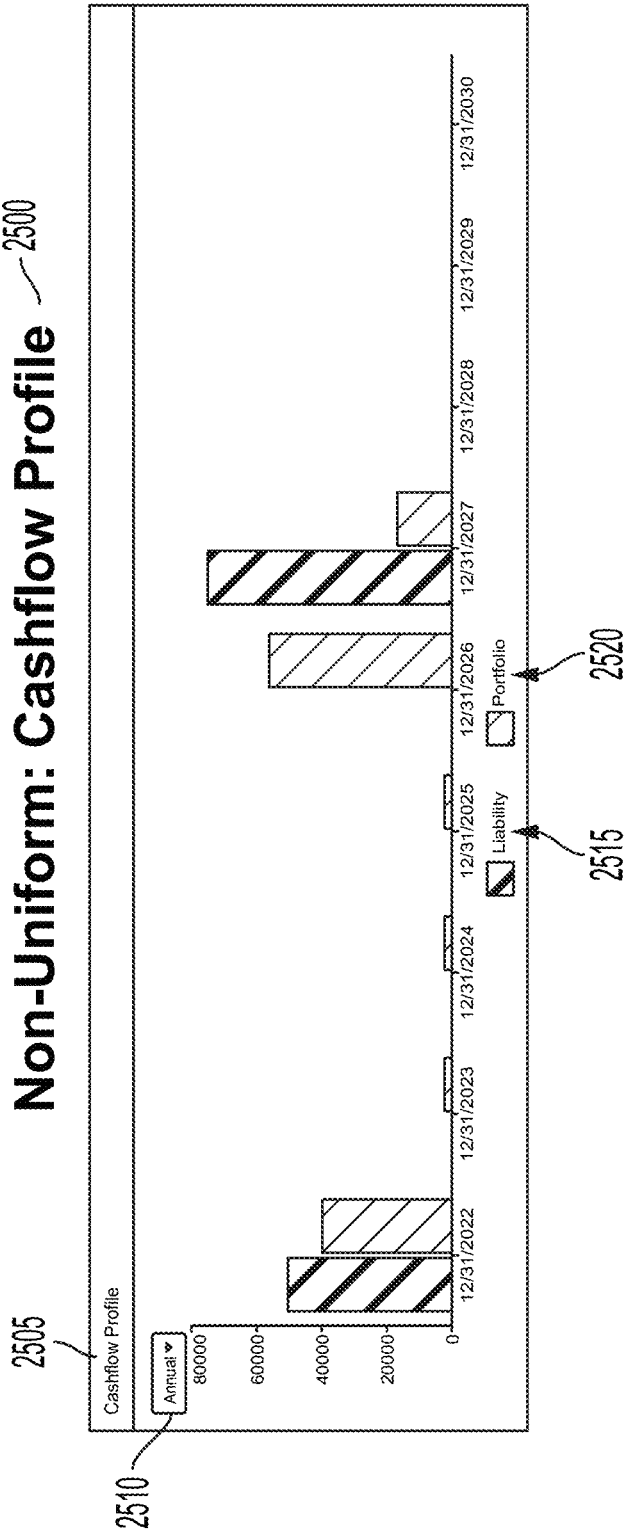
FIG. 25 illustrates an example graphical user interface showing a cashflow profile in a non-uniform distribution model of the asset management tool in accordance with an embodiment of the disclosure.

FIG. 25 illustrates an example graphical user interface showing a non-uniform: cashflow profile 2500 in a non-uniform distribution model of the asset management tool 500. The graphical user interface can display the projected liabilities (scheduled payouts) of the spending plan adjacent to the projected cash flows generated by the portfolio so as to compare expected inflows and outflows for a non-uniform spending plan. Projected cash flows generated by the portfolio and scheduled plan payouts may not align as income-driven investing utilizes a combination approach to mitigate interest rate risk (i.e., cashflow and duration match). The non-uniform: cashflow profile 2500 can be panel 2505 showing the cashflow of the non-uniform distribution model over a period of time. A cashflow toggle button 2510 may be present wherein the end user can toggle the period of viewed payments showing cash flow 2155 over a set period of time (e.g. monthly, yearly, etc.) Furthermore, the cash flow 2155 can be broken down into each liability metrics 2515 and portfolio metrics 2520. Each the liability metrics 2515 and the portfolio metrics 2520 can be visible to the end user in a graphical format over the selected period for payouts defined by the end user.

Figure 26:
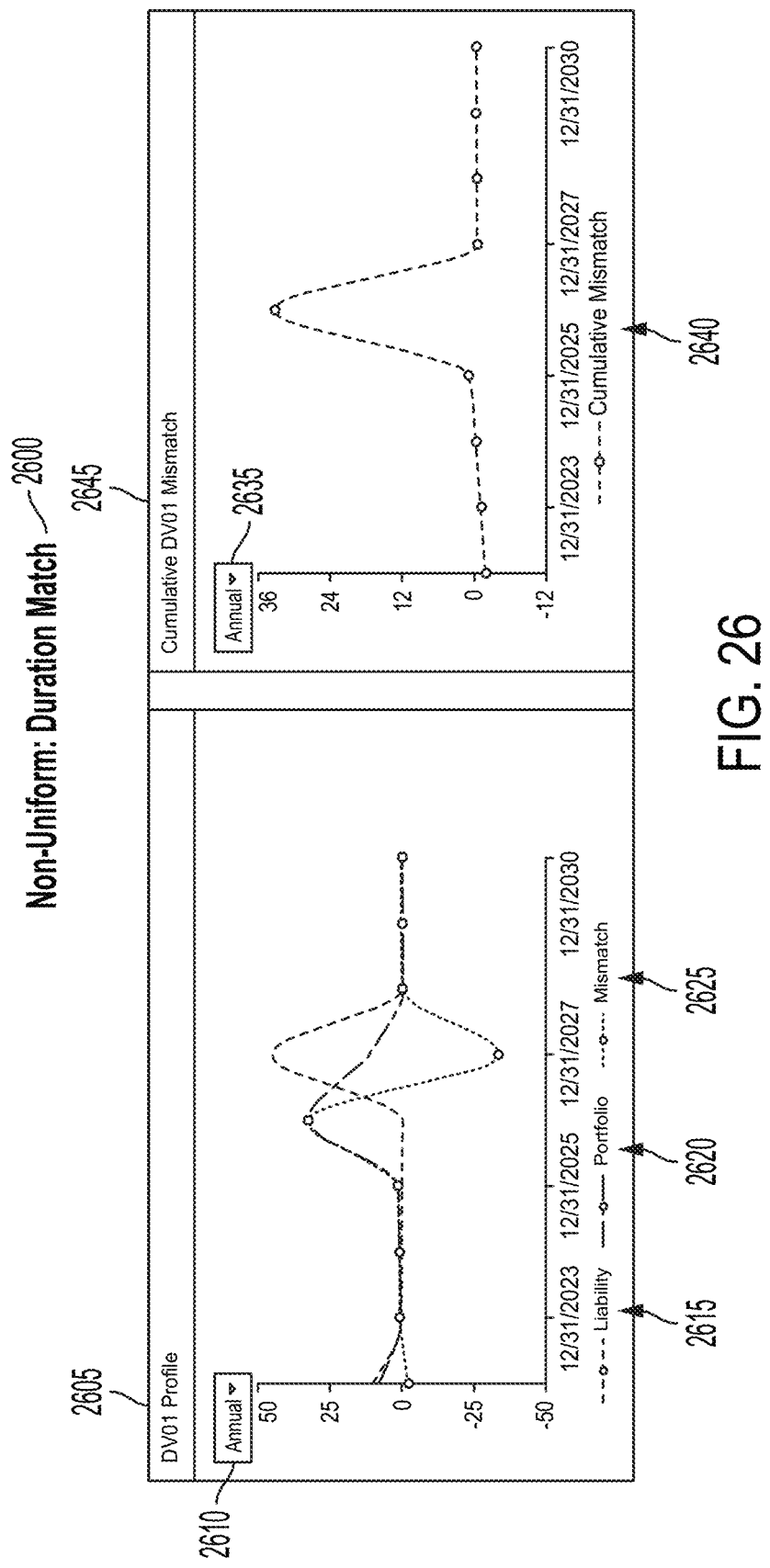
FIG. 26 illustrates an example graphical user interface showing a duration match in a non-uniform distribution model of the asset management tool in accordance with an embodiment of the disclosure.

FIG. 26 illustrates an example graphical user interface showing a non-uniform: duration match 2600 in a non-uniform distribution model of the asset management tool 500. The graphical user interface can display the dollar value of a basis point (DV01) of the liability as compared to the DV01 of the portfolio within a non-uniform spending plan, along with the amount by which they match or do not match, over time. This comparison can be illustrated by the graphical user interface in both point-in-time and cumulative measurements. The non-uniform: duration match 2600 can contain two different panels showing activity of the profile over a set period of time: a DV01 profile panel 2605 and a cumulative DV01 mismatch panel 2645. Within the DV01 profile panel 2605, period toggle button 2610 may be present wherein the end user can toggle the period of viewed payments showing information related to the created plan over a set period of time (e.g. monthly, yearly, etc.) During the selected period of time, liability data points 2615, portfolio data points 2620, and mismatch data points 2625 can be charted and interconnected to view a graphical representation of the DV01 profile over the selected period of time. Within the cumulative DV01 mismatch panel 2645, a mismatch period toggle button 2635 may be present wherein the end user can toggle the period of viewed DV01 mismatch information related to the created plan over a set period of time (e.g. monthly, yearly, etc.) During the selected period of time, cumulative mismatch data points 2640 can be charted and interconnected to view a graphical representation of the cumulative mismatch over the selected period of time.

Figure 27:
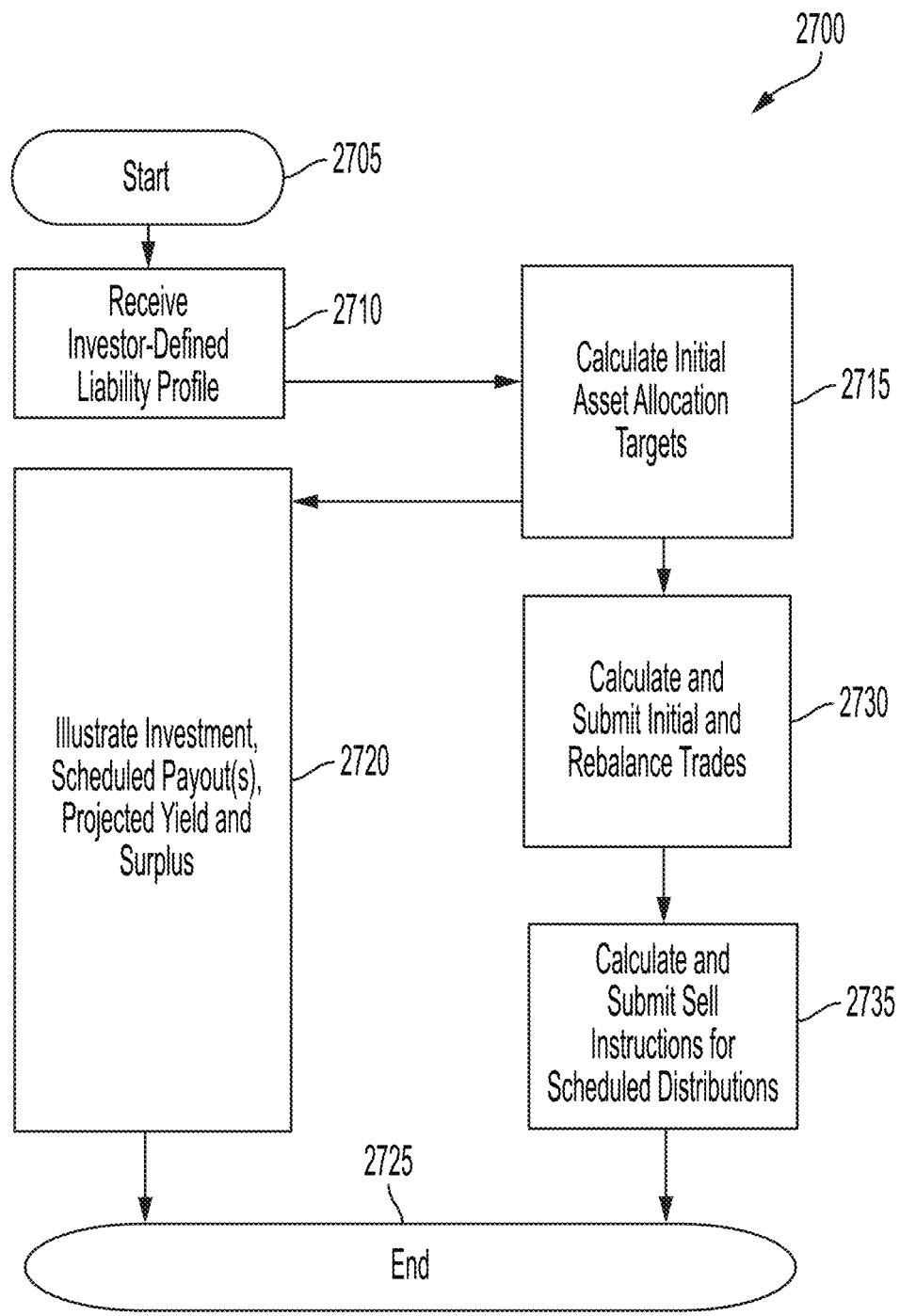
FIG. 27 illustrates a flow chart of the processes available to an end user of the asset management system in accordance with an embodiment of the disclosure.

FIG. 27 shows a flow chart 2700 of the processes available to an end user of the asset management system 100. In block 2705, an end user may log into or create an Individual Spending Account on the asset management system 100 to access the asset management tool 500. The log in procedure may be common to any type of software application where a user name and password, or other credentials transmitted from third parties ("single sign-on") are stored in the memory 115 of the asset management system 100 and associated with an account of the asset management system 100. A single sign-on system from a parent, roll up, or unified account is also envisioned. From there, the asset management tool 500 may receive the investor-defined liability profile 2710. This liability profile may be previously created by the end user of the account and pulled up for viewing by the end user. In other instances, new users will have the opportunity to create a new liability profile at this point. From there, the asset management tool moves on to a calculation of initial asset allocation targets 2715. In this step, the graphical user interface is provided to the end user for input of parameters related to investment amount, payout amount, and final payout date. The end user of the account can also choose whether the payouts will be distributed in a uniform or non-uniform fashion. Once the end user data is inputted into the asset management tool 500, the calculation engine 545 of the asset management tool 500 provides the necessary computation to create the desired liability profile. Then, the graphical user interface viewed by the end user of the account can illustrate the investment, scheduled payouts, projected yield, and projected surplus data 2720. If the information does not fit the desired investment results of the end user of the account, the end user may be able to reenter the necessary inputs to run an additional calculation by the asset management tool 500 to provide a more desired/accurate liability profile. Once satisfied, the end user of the account may be able to save the liability profile/ISP within the asset management tool 500. Saving the liability profile thereby allows the asset management tool 500 to execute the necessary transactions for the assets detailed in the liability profile with outside financial databases so that the liability profile is in operation to reach the desired payout goals defined by the end user. At this point, the creation and implementation of the liability profile ends 2725 and the end user may exit the system.

The asset management tool 500 can also run initial trades and rebalancing trades 2730 to update a portfolio for a given liability profile. Here, the asset management tool 500 processes trades with outside financial databases to confirm to the desired wishes of the end user. If a particular asset or investment is not performing to meet the required distributions set forth by the end user, the calculation engine 545 of the asset management tool 500 may run a rebalance model to improve the asset distribution to meet the desired payout amounts and schedule identified by the end user. If changes are needed to the assets or investments held by the end user, the asset management tool calculates and submits sell instructions for schedule distributions 2735. Once the portfolio is rebalanced, the sell and/or buy instructions are transmitted from the asset management tool 500 to the outside financial databases for complete rebalancing of the liability profile. Once it is confirmed that the portfolio is rebalanced by the asset management tool 500, the new profile may be stored in the memory of the asset management system 100 and the management process is complete 2725.

Figure 28:
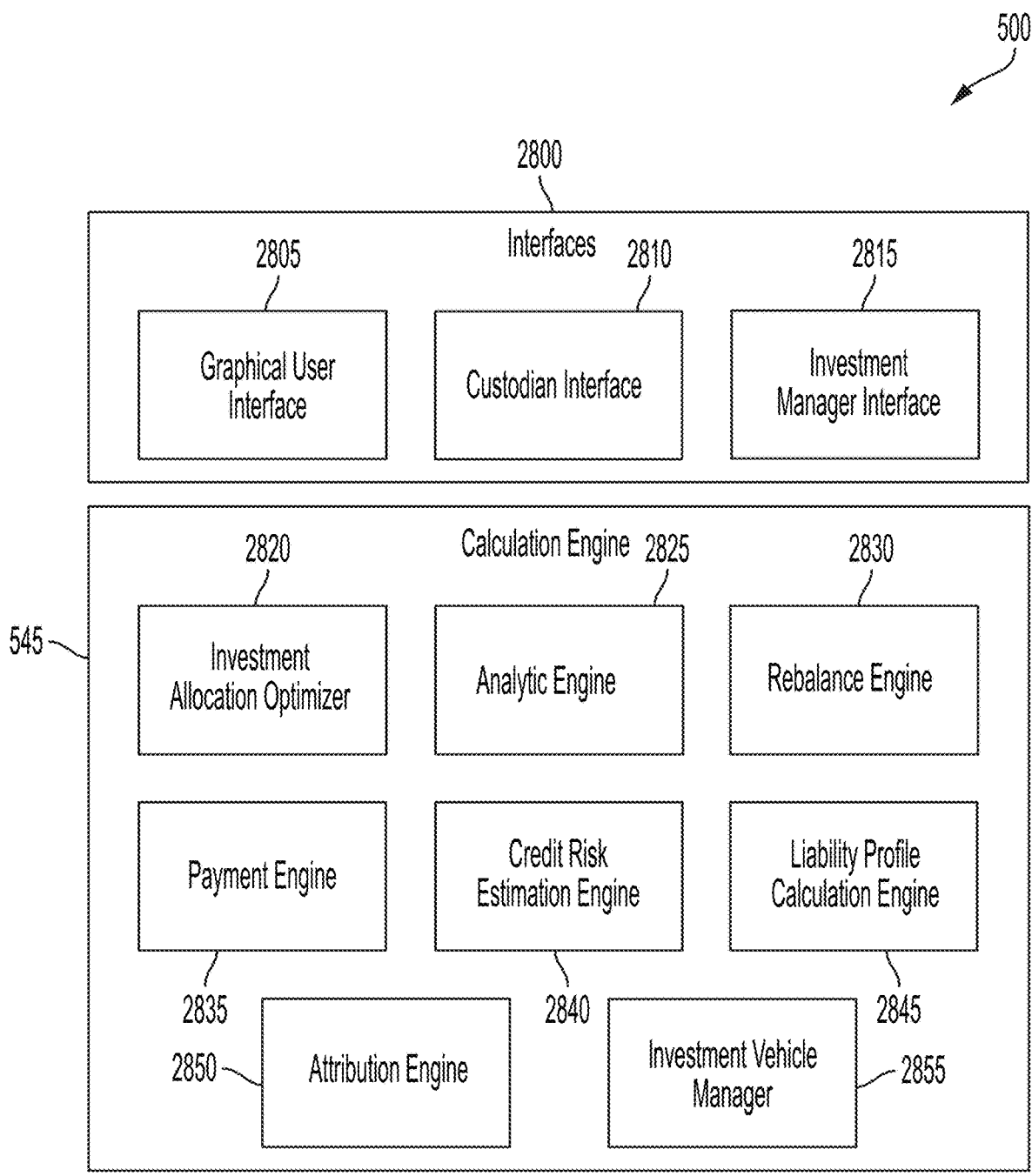
FIG. 28 illustrates high level components of the asset management tool in accordance with an embodiment of the disclosure.

FIG. 28 illustrates the high level components of the asset management tool 500. The interfaces 2800 to the asset management tool 500 include of a set of components that provide access to the tool for user interaction or data exchange. The graphical user interface 2805 allows a user to select, access, and control one or more Individual Spending Plans or liability portfolios of the asset management system 100. The custodian interface 2810 allows interaction and data exchange with custodial entities, which may include banks or other similar institutions. The investment manager interface 2815 allows interaction and data exchange with advisory platforms. The calculation engine 545 of the asset management tool 500 includes a set of components that allow the asset management tool 500 to create and manage Individual Spending Plans and their associated investment portfolios. The investment allocation optimizer 2820 provides a set of target asset allocations to DMFs and other fixed income instruments to achieve the objective set forth in the Individual Spending Plan or portfolio. The analytic engine 2825 calculates detailed cashflow-level and aggregate analytics for investment vehicle and liability profile cashflow streams. The rebalance engine 2830 uses a decision tree to determine when to reallocate assets among instruments within an Individual Spending Account to more closely match targets produced by the investment allocation optimizer. The payment engine 2835 manages cash flow into an Individual Spending Account through contributions, capital or interest payments, or other means, and manages cash flow out of an Individual Spending Account to meet the objectives of an Individual Spending Plan. The credit risk estimation engine 2840 uses historical credit default rates to predict future default rates and apply scaling factors to expected cash flows into the Individual Spending Account. The liability profile calculation engine 2845 translates parameters input by a user into a proposed liability profile (also known as an Individual Spending Plan), and manages reporting and status of currently executing plans. The attribution engine 2850 calculates portfolio performance/yield, and expected surplus and attributes changes to those metrics to changes in market data or analytics. Finally, the investment vehicle manager 2855 ingests and calculates prices and expected cashflows related to investment vehicles used in the solution.

Figure 29:
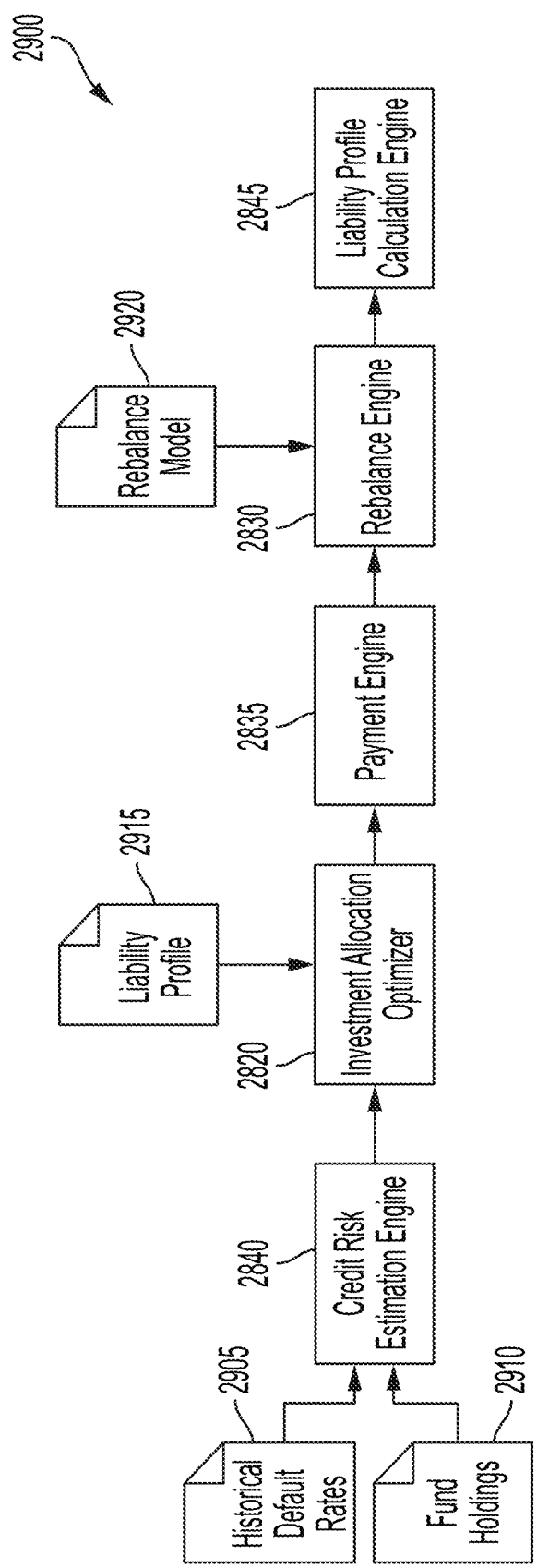
FIG. 29 illustrates an operational flow of the calculation engine components during operation of the asset management tool of the asset management system in accordance with an embodiment of the disclosure.

FIG. 29 illustrates an operational flow 2900 of the calculation engine 545 components during operation of the asset management tool 500 of the asset management system 100. The credit risk estimation engine 2840 receives inputs of historical default rates 2905 and fund holding information 2910 of the individual spending plan. The credit risk estimation engine 2840 uses this historical credit default rates 2905 to predict future default rates and apply scaling factors to expected cash flows of the fund holdings. Data from the credit risk estimation engine 2840 is then inputted into the investment allocation optimizer 2820. The investment allocation optimizer 2820 provides a set of target asset allocations from the receive liability profile 2915 of the end user to achieve the objectives set forth in the portfolio. From there, data from the investment allocation optimizer 2820 is then inputted into the payment engine 2835 of the calculation engine 545. The payment engine 2830 manages cash flow into the liability profile or accounts of the end user through contributions, dividends, or other means, and manages cash flow out to the end user of the liability profile or account to meet the objectives set by the end user. Once payment are sent out of the end user, or if new funds are added to the accounts of the end user, rebalancing of the operative profile is needed. Data from the payment engine 2835 is then sent to the rebalance engine 2830 to adjust the corresponding investment vehicles of the end user's profile or account. The rebalance engine 2830 uses a decision tree of the rebalance model 2920 described above to determine when to reallocate assets among instruments within the end user's account or profile to more closely match targets produced by the investment allocation optimizer 2820 representing the end user's account or profile. From there, data is then passed to the liability profile calculation engine 2845 which translates any outlying parameters inputs by the end user into the proposed liability profile. The calculation engine 545 may continuously reprocess the above data sets as overall changes occur within the system. For example, when payments are distributed to the end user, or if funds are added to the end user's account, the calculation engine 545 may undergo the above steps to make sure the liability profile of the end user is aligned with the end user's overall investment goals.

Figure 30:
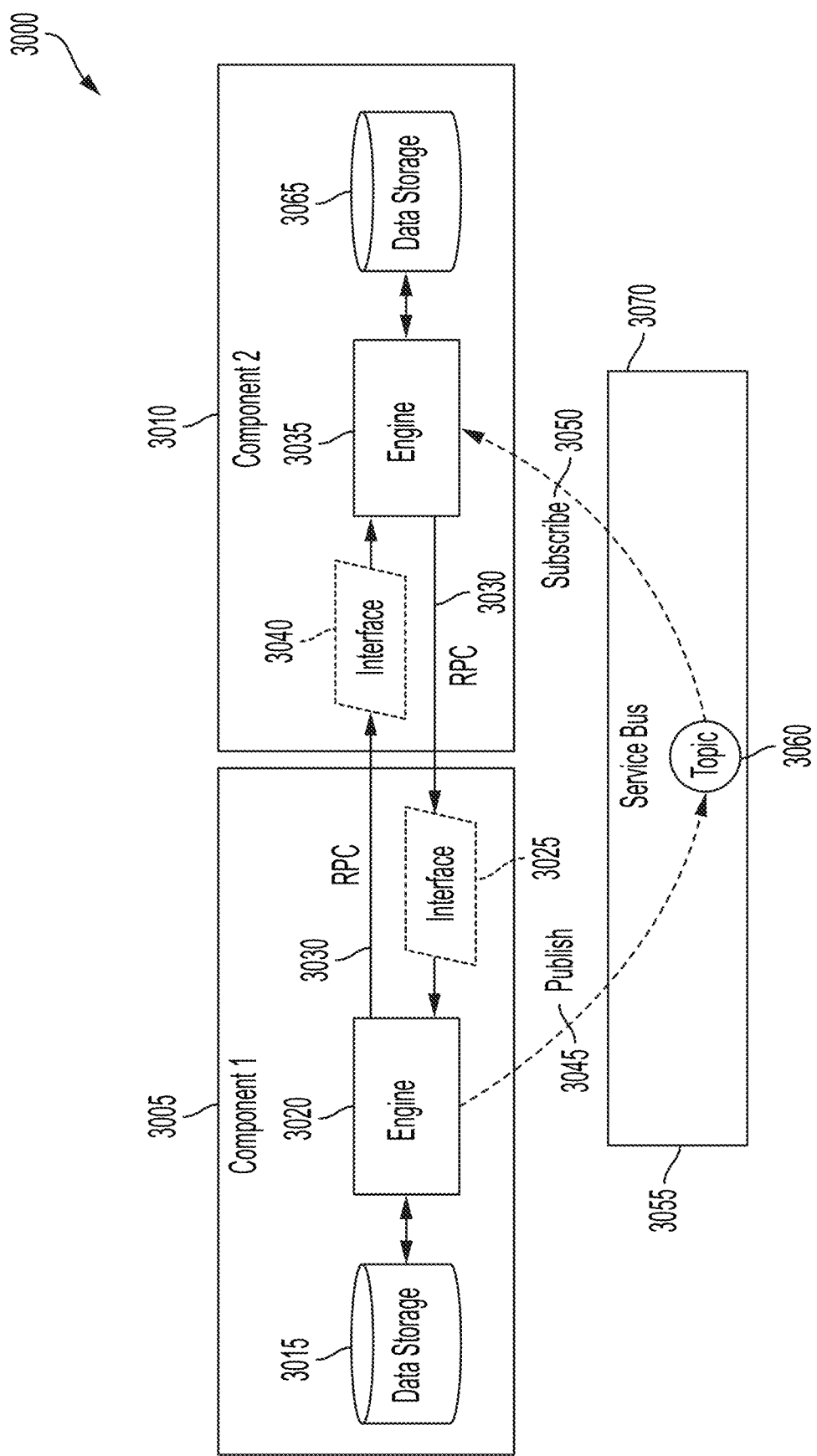
FIG. 30 illustrates a flowchart envisioning possible patterns of organization and communication between components of the calculation engine to develop and execute the calculated solution.

FIG. 30 illustrates the pattern 3000 of organization of components within the calculation engine 545 and communication mechanisms between them by demonstrating the interactions between two components 3005 and 3010. FIG. 30 refers to "Component 1" 3005 and "Component 2" 3010 for illustration, but the term "Components" may refer to a plurality of independent systems within the calculation engine 545, such as the investment allocation optimizer 2820, analytic engine 2825, rebalance engine 2830, payment engine 2835, credit risk estimation engine 2840, liability profile calculation engine 2845, attribution engine 2850, investment vehicle manager 2855, or other independent systems. Each component 3005 and 3010 is intended to perform a distinct function or grouping of functions within the calculation engine 545. Each component 3005 and 3010 is distinctly defined and isolated within the calculation engine 545 such that it can be operated, duplicated (scaled), and modified independently, with minimal impact to the overall calculation engine 545. Each component 3005 and 3010 can define an internal engine 3020 or 3030 that may contain functions and data access mechanisms that are independent from and not directly used by other components 3005 or 3010 in the calculation engine. Each component 3005 and 3010 can also define data storage mechanisms 3015 or 3065 that are distinct to the component 3005 or 3010 and are independent from and not directly used by other components 3005 and 3010 in the calculation engine 545.

Each component 3005 and 3010 can define an interface 3025 or 3040 which defines and describes all functions and data models of the component 3005 or 3010 that are exposed to other components in the calculation engine 545. Functions and data models defined in the interface 3025 or 3040 may be implemented by the component 3005 or 3010 and exposed for use by other components using functions and data in the internal engine 3020 or 3035 and data storage 3015 or 3065. The utilization of interfaces 3025 and 3040 in this manner allows the internal engine 3020 or 3035 and data storage 3015 or 3065 utilized by a component 3005 or 3010 to change with minimal impact to the calculation engine 545, so long as the interface 3025 or 3040 is still properly implemented by the component 3005 or 3010.

The components 3005 and 3010 can communicate with one another both synchronously and asynchronously. For synchronous communication, the components 3005 and 3010 leverage high-performance remote procedure call (RPC) technology 3030 that uses a binary serialization protocol and allows data exchange and function invocation between components 3005 and 3010 according to the defined interfaces 3025 and 3040 specified above. For asynchronous communication, the components 3005 and 3010 utilize publication/subscription techniques. A component 3005 can publish 3045 an event intended to notify another component 3010 of a change in the data or status of the component 3005 to a centralized service bus 3070, according to a topic 3060. "Topic" 3060 in this sense refers to an area of interest or concern. Other components 3005 or 3010 that have a need to be informed of events pertaining to one or more topics 3060 can subscribe 3050 to the topics 3060 for which they have concern on the service bus 3070, which will allow them to be notified of all events published that reference those topics 3070.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, different algorithms may be available for additional processing options by the calculation engine of the asset management tool or different user input options may be available on the graphical user interface for additional data to be inputted by the end user and used for computation by the calculation engine not expressly discussed within the present application. Thus, the breadth and scope of the present invention should not be limited by any of the above-described example embodiments, but should be defined only in accordance with the following claims appended hereto and their equivalents.

What is claimed is:

1. An asset management system comprising:
    a network interface through which an asset management tool communicates with a plurality of financial databases and a plurality of end user computers, the network interface allowing electronic content stored with the plurality of financial databases and inputs submitted by the plurality of end user computers to enter the asset management tool, and the network interface allowing the asset management tool to send executable instructions to the plurality of financial databases;
    a memory that comprises (1) the asset management tool, (2) user accounts, and (3) electronic content from the plurality of financial databases;
    a calculation engine as part of the asset management tool, the calculation engine having a plurality of components and a service bus, the plurality of components having each a component interface and a component data storage wherein each component of the plurality of components is defined in isolation within the calculation engine to allow for independent operation or modification, the plurality of components able to communicate with one another both synchronously and asynchronously, wherein synchronous communication is achieved through a remote procedure call from a first component of the plurality of components having a first component interface to a second component interface of a second component of the plurality of components, and wherein asynchronous communication is achieved through a publication from the first component of a topic to the service bus and a subscription by the second component or any other component of the plurality of components to the topic on the service bus to notify the second component or any other component of the plurality of components subscribed to the topic of an event published on the service bus referencing the topic; and
    a processor for cooperation with the memory, the calculation engine of the asset management tool, and the network interface, the processor configured to:
        receive electronic content from both the plurality of financial databases and the plurality of end user computers within the asset management tool;
        perform data analytics on the electronic content from the plurality of financial databases to produce a plurality of market data analytics via the first component of one of the plurality of components of the calculation engine;
        store the plurality of market data analytics within a first data storage associated with the first component;
        receive at least one parameter through the network interface via input from at least one of the plurality of end user computers associated with an end user of a user account;
        execute the plurality of components of the calculation engine using the at least one parameter;
        transmit the plurality of market data analytics from the first data storage of the first component to the second component via either direct synchronous communication between the first component and the second component, or asynchronous communication wherein the first component publishes each market data analytic to the service bus as the event for the topic and the second component being subscribed to the topic receives a notification for the event published on the service bus, the notification providing the second component access to each market data analytic of the plurality of market data analytics;
        create, by way of the second component utilizing the at least one parameter and the plurality of market data analytics received via synchronous or asynchronous communication with the first component, a plurality of liability profiles for the end user of the user account; and
        display the plurality of liability profiles created by the calculation engine to the end user of the user account on a graphical user interface accessible by the end user via at least one of the plurality of end user computers.

2. The asset management system of claim 1, wherein the electronic content from the plurality of financial databases includes a data feed of asset information, the data feed of asset information used to produce the plurality of market data analytics by the first component for use with the plurality of components of the calculation engine.

3. The asset management system of claim 1, wherein the at least one parameter input from the end user of the user account via at least one of the plurality of end user computers is an initial investment amount, a payout amount, or a final payout date of the liability profile.

4. The asset management system of claim 3, wherein a second parameter input of the initial investment amount, the payout amount, or the final payout date is entered by the end user of the user account via at least one of the plurality of end user computers.

5. The asset management system of claim 3, wherein the at least one parameter input and the second parameter input of the initial investment amount, the payout amount, or the final payout date entered by the end user of the user account are used by the calculation engine to create a first plurality of liability profiles displayed to the end user on the graphical user interface.

6. The asset management system of claim 5, wherein the at least one parameter input or the second parameter input of the initial investment amount, the payout amount, or the final payout date is an adjustable parameter updated by the end user of the user account, the adjustable parameter and the other of the at least one parameter or the second parameter entered by the end user of the user account used by the calculation engine to create a second plurality of liability profiles displayed to the end user on the graphical user interface.

7. The asset management system of claim 6, wherein the graphical user interface displays the first set plurality of liability profiles and the second set plurality of liability profiles created by the calculation engine to the end user to allow the end user to select at least one liability profile as a selected liability profile to be associated with the user account.

8. The asset management system of claim 1, wherein the graphical user interface displays an estimated monthly payment based on the plurality of liability profiles created by the calculation engine, a cash flow based on the plurality of liability profiles created by the calculation engine, and a surplus investment based on the plurality of liability profiles created by the calculation engine.

9. The asset management system of claim 1, wherein the graphical user interface displays a graphical payment representation of payment dates and payment amounts based on the plurality of liability profiles created by the calculation engine.

10. The asset management system of claim 1, wherein the graphical user interface displaying the plurality of liability profiles created by the calculation engine to the end user allows the end user to select at least one liability profile as a selected liability profile to be associated with the user account.

11. The asset management system of claim 10, further comprising the processor configured to store the selected liability profile for the end user of the user account within a second data storage associated with the second component of the calculation engine.

12. The asset management system of claim 11, further comprising the processor configured to
transmit buy or sell instructions from the calculation engine of the asset management tool via the network interface to the plurality of financial databases based on an asset of the selected liability profile to implement the selected liability profile stored within the second data storage of the second component in association with the end user.

13. The asset management system of claim 11, wherein the end user of the user account via at least one of the plurality of end user computers selects a uniform distribution of payments for the selected liability profile, and wherein the second data storage of the second component of the calculation engine updates the selected liability profile with the uniform distribution of payments.

14. The asset management system of claim 11, wherein the end user of the user account via at least one of the plurality of end user computers selects a non-uniform distribution of payments for the selected liability profile, and wherein the second data storage of the second component of the calculation engine updates the selected liability profile with the non-uniform distribution of payments.

15. An asset management system comprising:
a network interface through which an asset management tool communicates with a plurality of financial databases and a plurality of end user computers, the network interface allowing electronic content stored with the plurality of financial databases and inputs submitted by the plurality of end user computers to enter the asset management tool, and the network interface allowing the asset management tool to send executable instructions to the plurality of financial databases;
a memory that comprises (1) the asset management tool, (2) user accounts, and (3) electronic content from the plurality of financial databases;
a calculation engine as part of the asset management tool, the calculation engine having a plurality of components and a service bus, the plurality of components having each a component interface and a component data storage wherein each component of the plurality of components is defined in isolation within the calculation engine to allow for independent operation or modification, the plurality of components able to communicate with one another via synchronous communication and via asynchronous communication, wherein synchronous communication between the plurality of components is achieved through a remote procedure call from a first component of the plurality of components having a first component interface to a second component interface of a second component of the plurality of components, and wherein asynchronous communication between the plurality of components is achieved through a publication from the first component of a topic to the service bus and a subscription by the second component or any other component of the plurality of components to the topic on the service bus to notify the second component or any other component of the plurality of components subscribed to the topic of an event published on the service bus referencing the topic; and
a processor for cooperation with the memory, the calculation engine of the asset management tool, and the network interface, the processor configured to:
receive electronic content from the plurality of financial databases within the asset management tool;
perform data analytics on the electronic content from the plurality of financial databases to produce a plurality of market data analytics via the first component of one of the plurality of components of the calculation engine;
store the plurality of market data analytics within a first data storage associated with the first component;
retrieve a liability profile stored in a second data storage associated with the second component of the calculation engine, the liability profile having a scheduled payout structure created by an end user of at least one user account;
optimize asset allocation via a third component of the calculation engine to provide at least one targeted asset in accordance with the scheduled payout structure of the liability profile, the third component communicatively linkable in synchronous and asynchronous communication with both the first component and the second component to receive the plurality of market data analytics from the first component and the liability profile from the second component, the plurality of market data analytics and the liability profile operationally processed by the third component to output the at least one targeted asset;
create, by way of optimized asset allocation for the at least one targeted asset in accordance with the scheduled payout structure of the liability profile, a plurality of rebalanced liability profiles for the end user of the user account; and
display the plurality of rebalanced liability profiles created by the calculation engine to the end user of the user account on a graphical user interface accessible by the end user via at least one of the plurality of end user computers.

16. The asset management system of claim 15 further comprising the processor configured to receive at least one parameter through the network interface via input from an end user of a user account on at least one of the plurality of end user computers;
rebalance the at least one asset of the liability profile using the at least one parameter and the plurality of market data analytics via a rebalance algorithm to create the plurality of rebalanced liability profiles for the end user of the user account, the rebalance algorithm executed by a fourth component of the calculation engine to stabilize accuracy of the liability profile in association with the at least one targeted asset and the at least one parameter in accordance with the scheduled payout structure, the fourth component communicatively linkable in synchronous and asynchronous communication with the first component, the second component, and the third component to receive the plurality of market data analytics from the first component, the liability profile from the second component, and the at least one targeted asset from the third component;

display the plurality of rebalanced liability profiles created by the calculation engine to the end user to allow the end user to select at least one rebalanced liability profile as a selected rebalanced liability profile; and the processor configured to store the selected rebalanced liability profile for the end user of the user account within a second data storage associated with the second component of the calculation engine.

17. The asset management system of claim 16 further comprising the processor configured to transmit buy or sell instructions to the plurality of financial databases from the calculation engine of the asset management tool via the network interface based on an asset of the selected rebalanced liability profile to implement the selected rebalanced liability profile.

18. The asset management system of claim 16 wherein the graphical user interface displays an estimated monthly payment, a cash flow, and a surplus investment based on the selected rebalanced liability profile.

19. The asset management system of claim 16 wherein the graphical user interface displays a graphical payment representation of payment dates and a graphical payment representation of payment amounts based on the selected rebalanced liability profile.

20. The asset management system of claim 15, wherein the graphical user interface displaying the plurality of rebalanced liability profiles created by the calculation engine to the end user allows the end user to select at least one rebalanced liability profile as a selected rebalanced liability profile; and the processor configured to store the selected rebalanced liability profile for the end user of the user account within a second data storage associated with the second component of the calculation engine.

* * * * *